US012656873B1

(12) United States Patent　　　　(10) Patent No.:　US 12,656,873 B1

Aceros et al.　　　　　　　　　　　(45) Date of Patent:　Jun. 16, 2026

(54) APPARATUS AND METHOD FOR DEVELOPMENTAL AND/OR REHABILITATIVE SENSORY SUBSTITUTION

(71) Applicants: Juan Aceros, St. Johns, FL (US); Matthew Cantwell, Orange Park, FL (US); John Prisco, Canton, GA (US)

(72) Inventors: Juan Aceros, St. Johns, FL (US); Matthew Cantwell, Orange Park, FL (US); John Prisco, Canton, GA (US)

(73) Assignee: University of North Florida Board of Trustees, Jacksonville, FL (US)

( * ) Notice: Subject to any disclaimer, the term of this patent is extended or adjusted under 35 U.S.C. 154(b) by 0 days.

(21) Appl. No.: 19/006,448

(22) Filed: Dec. 31, 2024

Related U.S. Application Data

(63) Continuation of application No. 18/474,537, filed on Sep. 26, 2023, now Pat. No. 12,182,331, which is a continuation of application No. 17/939,421, filed on Sep. 7, 2022, now Pat. No. 11,836,291.

(60) Provisional application No. 63/241,312, filed on Sep. 7, 2021.

(51) Int. Cl.
　　　*A61H 1/02*　　　　(2006.01)
　　　*G06F 3/01*　　　　(2006.01)
(52) U.S. Cl.
　　　CPC .............. *G06F 3/016* (2013.01); *G06F 3/011* (2013.01)

(58) Field of Classification Search
　　　None
　　　See application file for complete search history.

(56)　　　　　　　References Cited

U.S. PATENT DOCUMENTS

| | | | |
|---|---|---|---|
| 11,809,629 B1 * | 11/2023 | Segil | G06F 3/016 |
| 2018/0081477 A1 * | 3/2018 | Picciotto | G06F 3/044 |
| 2021/0064143 A1 * | 3/2021 | Stern | G06F 3/04886 |
| 2021/0186794 A1 * | 6/2021 | Seim | A61H 1/0274 |

* cited by examiner

*Primary Examiner* — Carl Adams

(74) *Attorney, Agent, or Firm* — Molly L. Sauter; Trenam Law

(57)　　　　　　　ABSTRACT

Described herein relates to an apparatus and method for developmental and/or rehabilitative sensory substitution to augment at least one low-functioning and/or non-functioning senses in at least one user. The apparatus may include an input module that may allow the user to perform various tasks designed to enhance development of or sensory recognition by the user. The apparatus may be capable of multiple different proportional controls and of being used across ages, sizes, and developmental stages. For example, the apparatus may include at least one joystick, button, lever, and accelerometer, such that a sensory feedback response (e.g., haptic/tactile, visual, and/or auditory) may be provided to the user across a plurality of exercises. Additionally, the apparatus may provide a new standard of care for individuals with special needs and/or those recovering from a traumatic physical and/or mental injury, regardless of ability level and age.

20 Claims, 16 Drawing Sheets

300

400

402

400

402

406

420

404

400

402a

402b

404

420

400

420

402

404

406

500

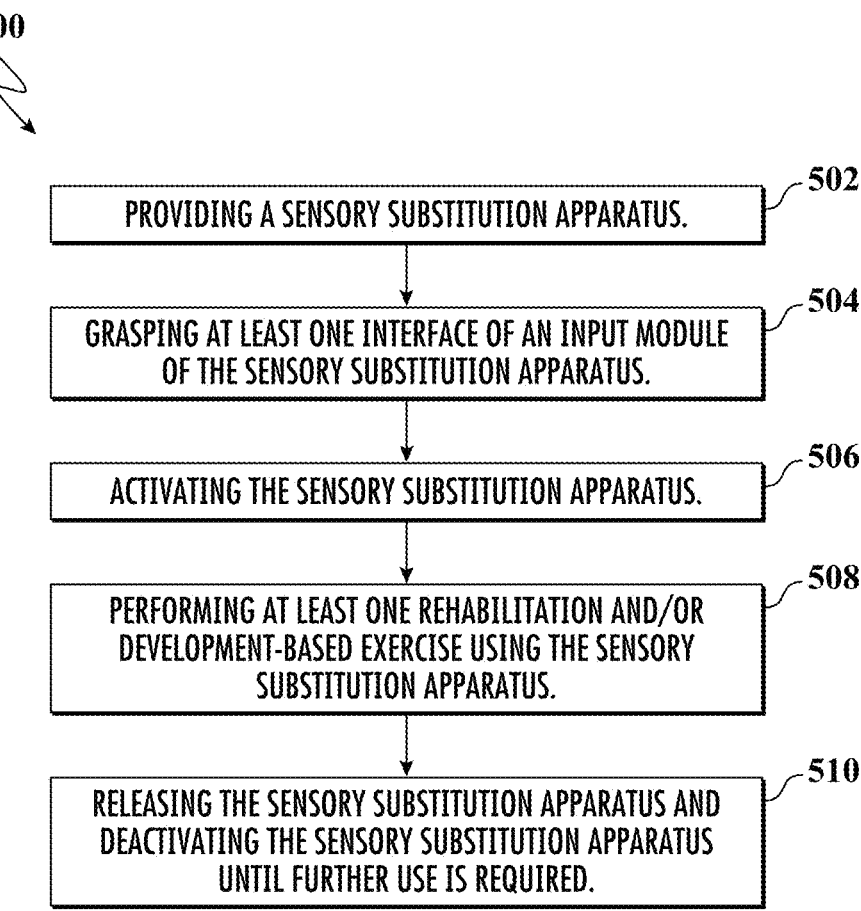

502

PROVIDING A SENSORY SUBSTITUTION APPARATUS.

504

GRASPING AT LEAST ONE INTERFACE OF AN INPUT MODULE
OF THE SENSORY SUBSTITUTION APPARATUS.

506

ACTIVATING THE SENSORY SUBSTITUTION APPARATUS.

508

PERFORMING AT LEAST ONE REHABILITATION AND/OR
DEVELOPMENT-BASED EXERCISE USING THE SENSORY
SUBSTITUTION APPARATUS.

510

RELEASING THE SENSORY SUBSTITUTION APPARATUS AND
DEACTIVATING THE SENSORY SUBSTITUTION APPARATUS
UNTIL FURTHER USE IS REQUIRED.

*FIG. 7*

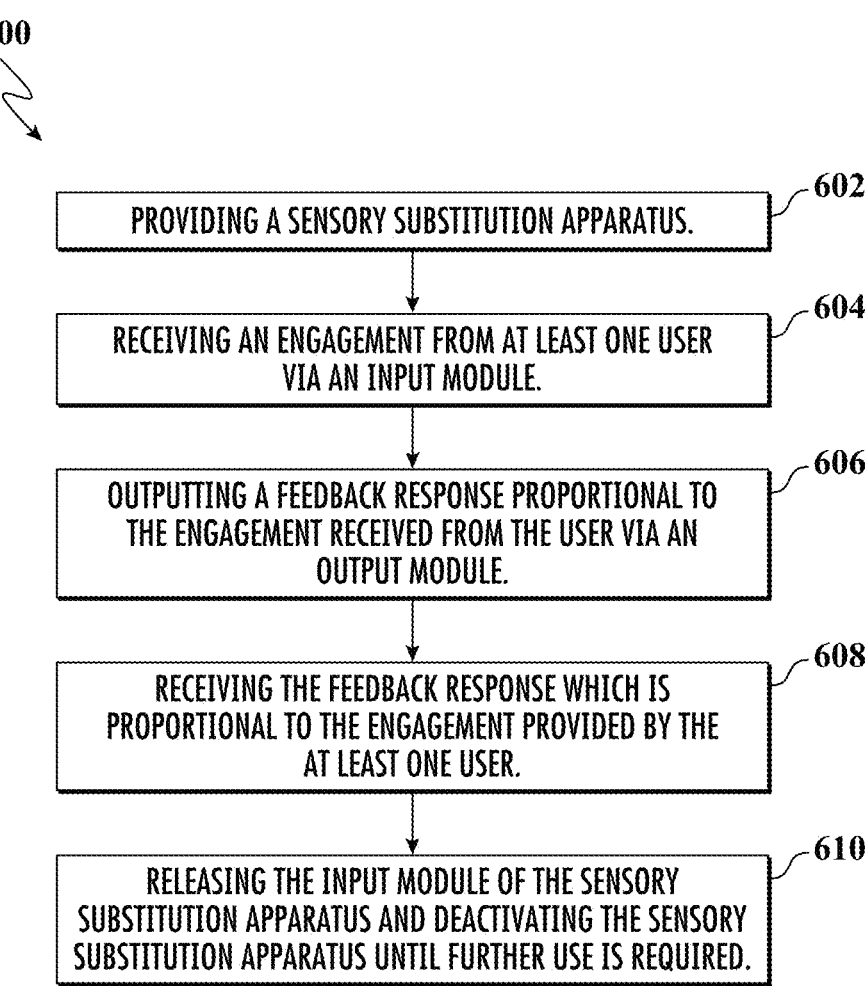

600

602

PROVIDING A SENSORY SUBSTITUTION APPARATUS.

604

RECEIVING AN ENGAGEMENT FROM AT LEAST ONE USER VIA AN INPUT MODULE.

606

OUTPUTTING A FEEDBACK RESPONSE PROPORTIONAL TO THE ENGAGEMENT RECEIVED FROM THE USER VIA AN OUTPUT MODULE.

608

RECEIVING THE FEEDBACK RESPONSE WHICH IS PROPORTIONAL TO THE ENGAGEMENT PROVIDED BY THE AT LEAST ONE USER.

610

RELEASING THE INPUT MODULE OF THE SENSORY SUBSTITUTION APPARATUS AND DEACTIVATING THE SENSORY SUBSTITUTION APPARATUS UNTIL FURTHER USE IS REQUIRED.

*FIG. 8*

APPARATUS AND METHOD FOR DEVELOPMENTAL AND/OR REHABILITATIVE SENSORY SUBSTITUTION

CROSS-REFERENCE TO RELATED APPLICATIONS

This nonprovisional application is a continuation of and claims the benefit of and priority to U.S. Nonprovisional patent application Ser. No. 18/474,537, now U.S. Pat. No. 12,182,331, entitled "APPARATUS AND METHOD FOR DEVELOPMENTAL AND/OR REHABILITATIVE SENSORY SUBSTITUTION", filed Sep. 26, 2023 by the same inventors, which is a continuation of and claims the benefit of and priority to U.S. Nonprovisional patent application Ser. No. 17/939,421, now U.S. Pat. No. 11,836,291, entitled "APPARATUS AND METHOD FOR DEVELOPMENTAL AND/OR REHABILITATIVE SENSORY SUBSTITUTION", filed Sep. 7, 2022 by the same inventors, which claims the benefit of and priority to U.S. Provisional Patent Application No. 63/241,312 entitled "SYSTEMS AND METHODS FOR SENSORY SUBSTITUTION INCLUDING A HAND-OPERATED INSTRUMENT WITH PROPORTIONAL RESPONSE FOR USE THEREWITH" filed Sep. 7, 2021 by the same inventors, all of which are incorporated herein by reference, in their entireties, for all purposes.

FEDERALLY SPONSORED RESEARCH OR DEVELOPMENT

This invention was made with Government support under Grant Nos. 1R25HD087971 and 1R25HD094335 awarded by the National Institutes of Health (NIH). The government has certain rights in the invention.

BACKGROUND OF THE INVENTION

1. Field of the Invention

This invention relates, generally, to sensory substitution. More specifically, it relates to an apparatus and method for developmental and/or rehabilitative sensory substitution to augment at least one low-functioning and/or non-functioning senses in at least one user.

2. BRIEF DESCRIPTION OF THE PRIOR ART

For individuals with developmental and sensory challenges, traditional rehabilitation and development devices and training methods are designed to improve quality of life and to stimulate interactivity and development. For example, powered developmental devices exist that include electrical functions to promote interactivity through tactile responses or other motivating factors. In addition, non-powered systems exist to promote brain activity through interactivity without requiring an external power source, such that a user, such as a child or a rehabilitating patient, can utilize the device regardless of electrical connectivity [1]. Such systems typically include puzzle-type elements that encourage solving a problem through sensory interactivity [2] but fail to provide feedback to the user based on the non-electrical nature of the devices. In addition, wearable devices can be used to promote balance in individuals who suffer from balance-related disabilities, with feedback being provided to the users through either electronic communications or through haptic feedback.

While developmental and sensory-based systems and devices exist, there remains a need within the industry for real-time feedback-based devices that provide responses to the user based on proportionality, thereby mimicking real-life situations, to help promote development and rehabilitation. For example, as noted above, powered developmental devices exist; however, such systems often present the user with binary choices to solve a problem or to perform an action. As such, these devices are limited in their functionality for a particular user to the binary choices, and while the user can learn and develop from such devices, development is inherently limited by the choices presented to the user. Moreover, current haptic feedback-based devices typically include a virtual reality component for a displayed response, making the systems promising but costly and cumbersome [3].

In addition, many developmental devices are age and developmental-stage specific, often sized for use by a particular age group without being capable of serving individuals of different age groups, sizes, and developmental stages. As such, replacement devices are required as a child grows in size, and the same device cannot be used for both a child and an adult, thereby resulting in inefficient manufacturing and purchasing requirements.

While these powered and non-powered systems have shown promise in the rehabilitation and developmental improvements of users, the lack of proportionality of responses limits extensions of the systems for use throughout the rehabilitation process.

Accordingly, what is needed is an easy-to-use, efficient, and age-encompassing apparatus and method for developmental and/or rehabilitative sensory substitution to augment at least one low-functioning and/or non-functioning senses in at least one user. However, in view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need, stated above, is now met by a novel and non-obvious invention disclosed and claimed herein. In an aspect, the present disclosure pertains to a sensory substitution apparatus for augmenting a low-functioning sense and/or a non-functioning sense of a user. In an embodiment, the sensory substitution apparatus may comprise a housing having a processor, the processor being configured to be disposed within the housing. In this embodiment, the sensory substitution apparatus may also comprise an input module, which may be configured to be selectively coupled to the housing. In addition, the input module may also comprise at least one interface, such that the interface may be configured to detect an engagement of the user. Moreover, in this embodiment, responsive to the engagement of the user, the input module is configured to output at least one input signal.

Additionally, the sensory substitution apparatus may also comprise an output module, which may be configured to be selectively coupled to the housing. The output module may be configured to provide a sensory feedback response to the user. In this embodiment, the sensory substitution apparatus may further comprise an electronic circuitry, which may be disposed within the housing, the input module, and/or the output module, such that the electronic circuitry may be configured to selectively supply the electric current to the output module. Furthermore, in this embodiment, the processor may be configured to be in electrical communication with the group including but not limited to the electronic circuitry, the input module, and/or the output module. As such, responsive to receiving the at least one input signal, the processor may be configured to activate the output module and/or to cause the electronic circuitry to supply the electronic current to the output module. In this manner the sensory feedback response may be provided to the user, allowing the sensory feedback response to augment the low-functioning sense, the non-functioning sense, and/or any sense of a user known in the art, such that the development and/or rehabilitation, of the low-functioning sense and/or the non-functioning sense, of the user is optimized.

In an embodiment, the at least one interface may comprise a surface configured to be touched by the user. In this embodiment, the electric current supplied to the output module may be configured to increase and/or decrease in response to changes in a normal force applied to the at least one interface as the user engages with the user interface. As such, in this embodiment, the input module may be selected from a group including, but not limited to, a button, a handle, a joystick, a sensor, a microphone, a wheel, a handle, and/or any surface known in the art in which may be interacted with by the user. Additionally, in this embodiment, the output module may be selected from a group including, but not limited to, at least one light, at least one light array, at least one haptic motor, a fan, an audio-based device, and/or any device known in the art which may provide a sensory feedback response to the user, including but not limited to a haptic and/or a visual feedback.

In some embodiments, the housing may further comprise a first end and a second end, such that a first handle may be disposed at the first end, and a second handle may be disposed at the second end. Moreover, in these other embodiments, the output module may also further comprise at least one haptic motor disposed within the first handle and/or the second handle, such that as the output module is being activated, the at least one haptic motor, via the first handle and/or the second handle, respectively, may be configured to output the sensory feedback response to the user. In addition, the output module may also include at least one light, where the at least one light may be configured to be temporarily affixed to the housing. As such, in these other embodiments, as the output module is activated, the at least one light may be configured to output the sensory feedback response to the user.

In some embodiments, the input module may comprise at least one sensor, such that the at least one sensor may be configured to detect a normal distance of the housing with respect to the user and/or a predefined area. In these other embodiments, the electric current supplied to the output module may be configured to increase and/or decrease in response to changes in the normal distance between the housing and the user and/or the predefined area as the user translates the housing from a first predetermined location toward a second predetermined location.

Another aspect of the present disclosure pertains to a sensory substitution apparatus for augmenting a low-functioning sense and/or a non-functioning sense of a user. In an embodiment, the sensory substitution system may comprise a housing which may include a processor. As such, the processor may be configured to be disposed within the housing. Additionally, in this embodiment, the housing may have a first end and a second end, such that a first handle may disposed at the first end and a second handle may be disposed at the second end. In addition, in this embodiment, the sensory substitution apparatus may also comprise an input module configured to be selectively coupled to the housing, where the input module may comprise at least one interface. The interface may be configured to detect an engagement of the user, such that responsive the engagement of the user, the input module may be configured output at least one input signal.

In addition, in this embodiment, the sensory substitution apparatus may include an output module, which may be configured to selectively coupled to the housing. In this manner, the output module may comprise at least one haptic motor disposed within the first handle, and/or the second handle. Accordingly, the at least one haptic motor may be configured to output a sensory feedback response. Moreover, in this embodiment, the sensory substitution apparatus may also have an electronic circuitry disposed within the housing, the input module, and/or the output module, such that the electronic circuitry may be configured to selectively supply the electric current to the output module. As such, in this embodiment, the processor may be configured to be in electrical communication with the group including, but not limited to the electronic circuitry, the input module, and/or the output module. Accordingly, responsive to receiving the at least one input signal, the processor may be configured to activate the output module and to cause the electronic circuitry to supply the electronic current to the output module, such that the output module is activated, such that the at least one haptic motor, via the first handle and/or the second handle, respectively, may be configured to output the sensory feedback response to the user. By outputting the sensory feedback response, in this embodiment, the low-functioning sense and/or the non-functioning sense of the user may be augmented, optimizing development and/or rehabilitation of the low-functioning sense and/or the non-functioning sense of the user.

In some embodiments, the input module may comprise at least one sensor, such that the at least one sensor may be configured to detect a normal distance of the housing with respect to the user and/or a predefined area. In these other embodiments, the output module may also comprise at least one light, where the at least one light may be configured to be temporarily affixed to the housing. Accordingly, in these other embodiments, responsive to the output module being activated, the at least one light may be configured to output the sensory feedback response to the user. As such, the electric current supplied to the output module may be configured to increase and/or decrease in response to changes in the normal distance between the housing and the user and/or the predefined area as the user translates the housing from a first predetermined location toward a second predetermined location. In these other embodiments, the at least one interface may comprise a surface configured to be touched by the user.

Furthermore, another aspect of the present disclosure pertains to a method for augmenting a low-functioning sense and/or a non-functioning sense of a user using a sensory substitution apparatus. In an embodiment, the method may comprise the following steps, including but not limited to, first coupling a housing of the sensory substitution apparatus to an input module. In this embodiment, the housing may comprise a processor, such that the processor may be disposed within the housing. In addition, in this embodiment, the input module may also comprise at least one interface, wherein the interface may be configured to detect an engagement of the user. The next step of the method may comprise coupling the housing of the sensory substitution apparatus to an output module. In this embodiment, the output module may be configured to provide a sensory feedback response to the user when an electric current is supplied thereto. As such, the next step of the method may comprise detecting, via the input module of the sensory substitution apparatus, engagement of the user with the at least one interface. Moreover, subsequent to detecting engagement of the user with the at least one interface, the next step of the method may comprise activating the output module and causing an electronic circuitry to supply the electronic current to the output module. Accordingly, the final step of the method may comprise providing the sensory feedback response to the user, such that the low-functioning sense and/or the non-functioning sense of the user may be augmented, optimizing development and/or rehabilitation of the low-functioning sense and/or the non-functioning sense of the user.

In some embodiments, the at least one interface may comprise a surface configured to be touched by the user. As such, in these other embodiments, the electric current supplied to the output module may be configured to increase and/or decrease in response to changes in a normal force applied to the at least one interface as the user engages with the user interface.

In some embodiments, the input module may be selected from a group including but not limited to of a button, a handle, a joystick, a sensor, a microphone, a wheel, a yoke, a handle, and/or any surface known in the art in which may be interacted with by the user. Additionally, in these other embodiments, the output module may be selected from a group including but not limited to at least one light, at least one light array, at least one haptic motor, a fan, an audio-based device, and/or any device known in the art which may provide a sensory feedback response to the user, including but not limited to a haptic and/or a visual feedback.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

6

Figure 1A:
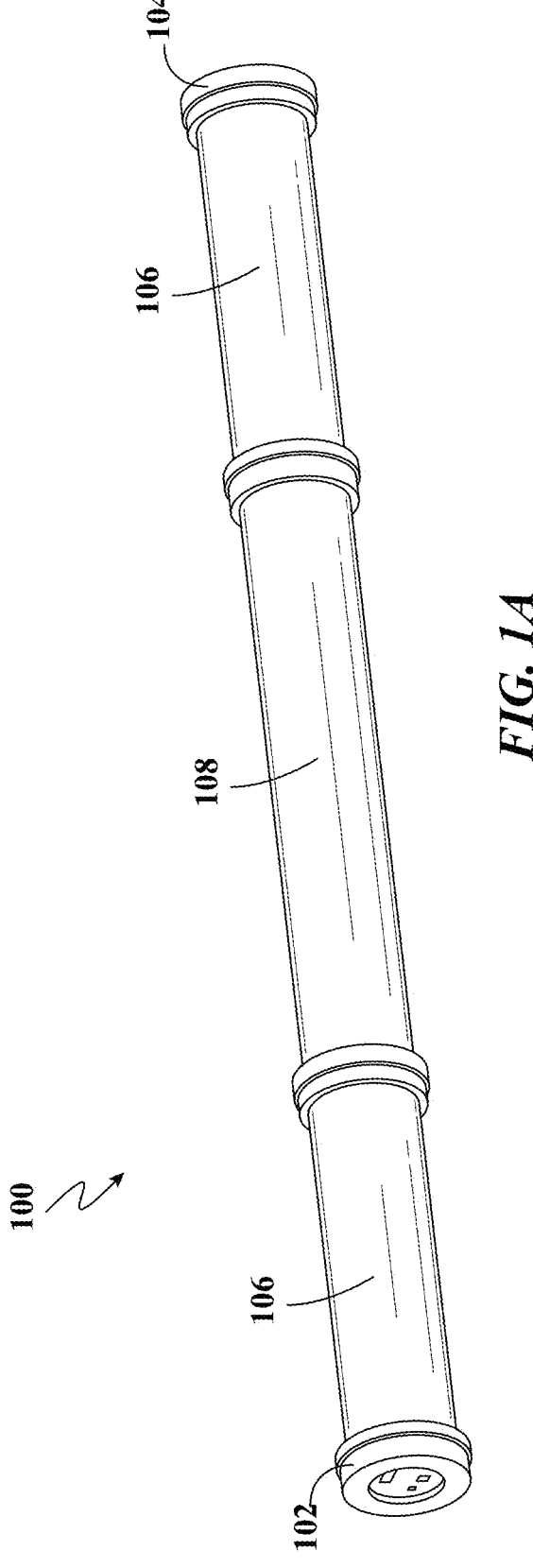
FIG. 1A is a perspective view of an exemplary configuration of a sensory substitution apparatus, according to an embodiment of the present disclosure.
Figure 1B:
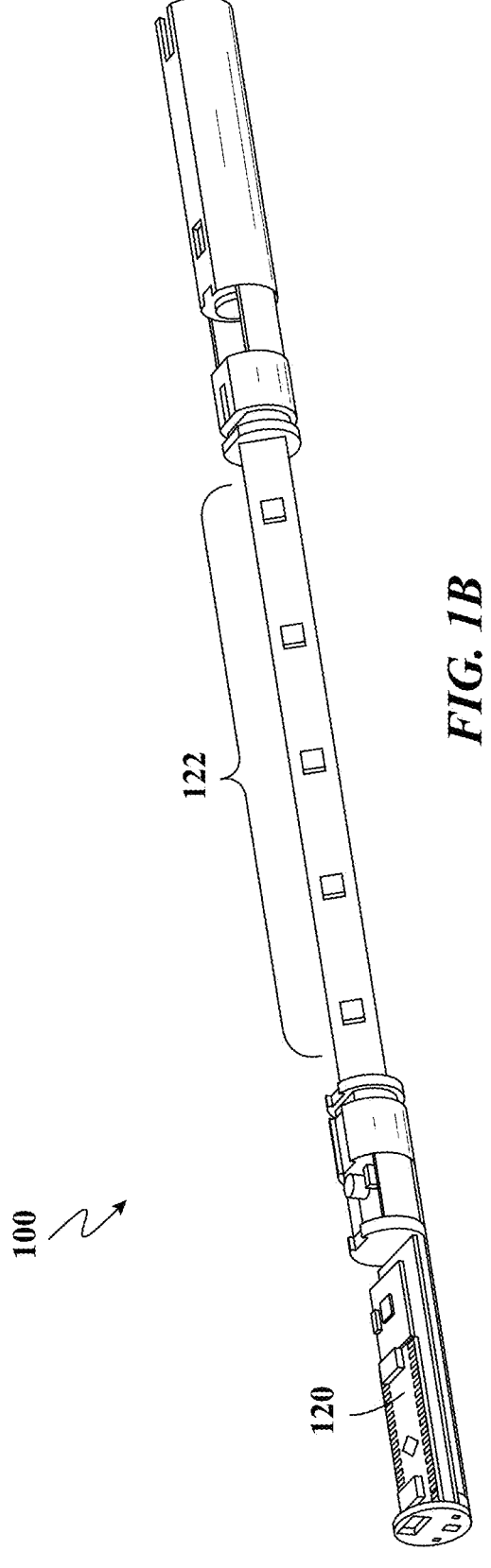
FIG. 1B is a perspective view of internal components of the configuration of the sensory substitution apparatus of FIG. 1A, according to an embodiment of the present disclosure.
Figure 2A:
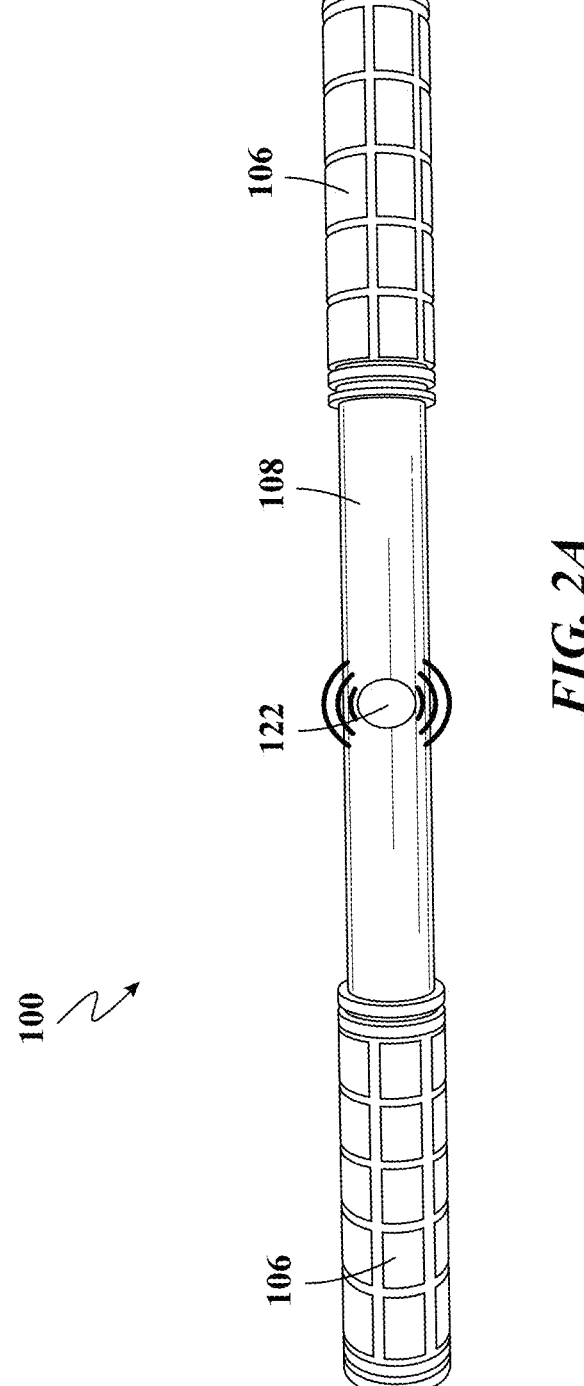

FIG. 2A is an elevational view of the configuration of the sensory substitution apparatus of FIG. 1A, according to an embodiment of the present disclosure.

Figure 2B:
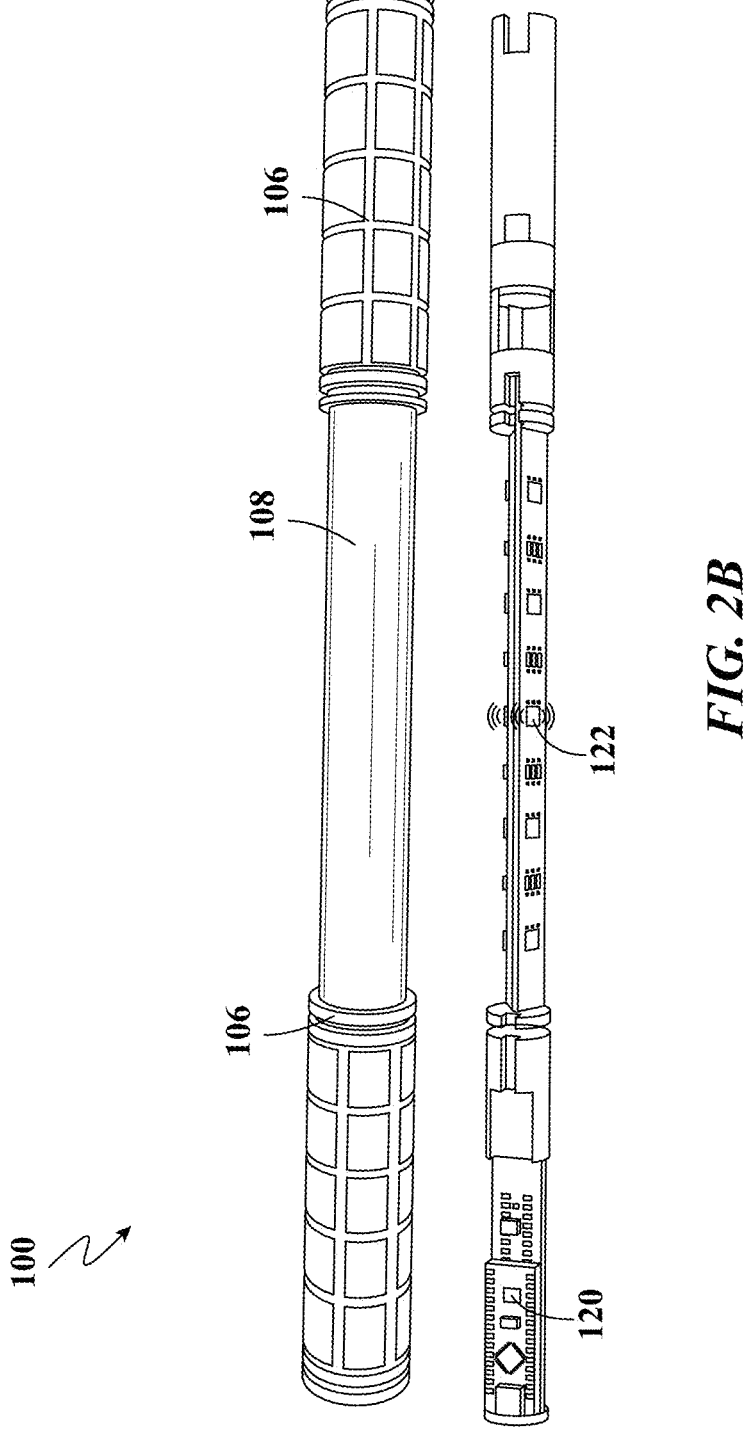

FIG. 2B is an elevational disassembled view of the configuration of the sensory substitution apparatus of FIG. 1A, according to an embodiment of the present disclosure.

Figure 3A:
Figure 3A:
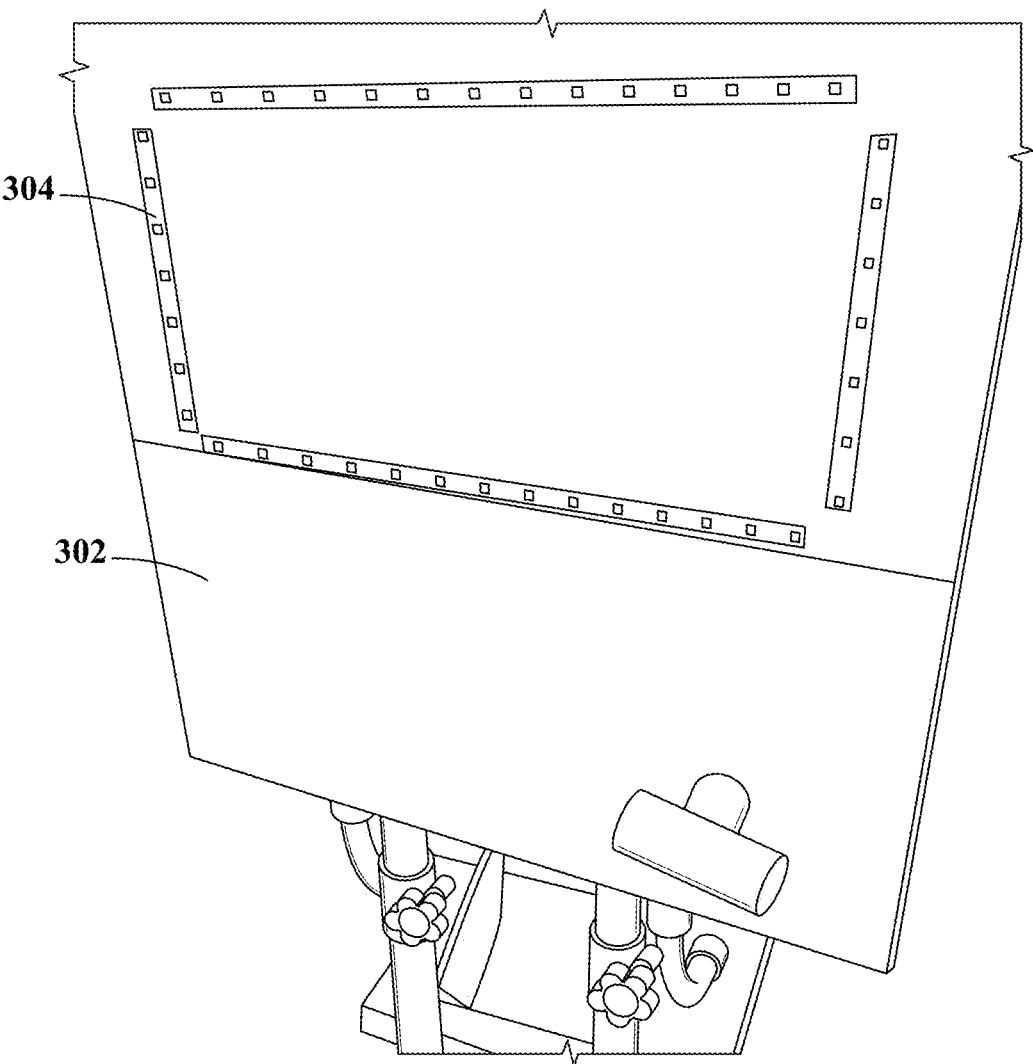

FIG. 3A is a perspective view of an output module of an alternative configuration of a sensory substitution apparatus, according to an embodiment of the present disclosure.

Figure 3B:
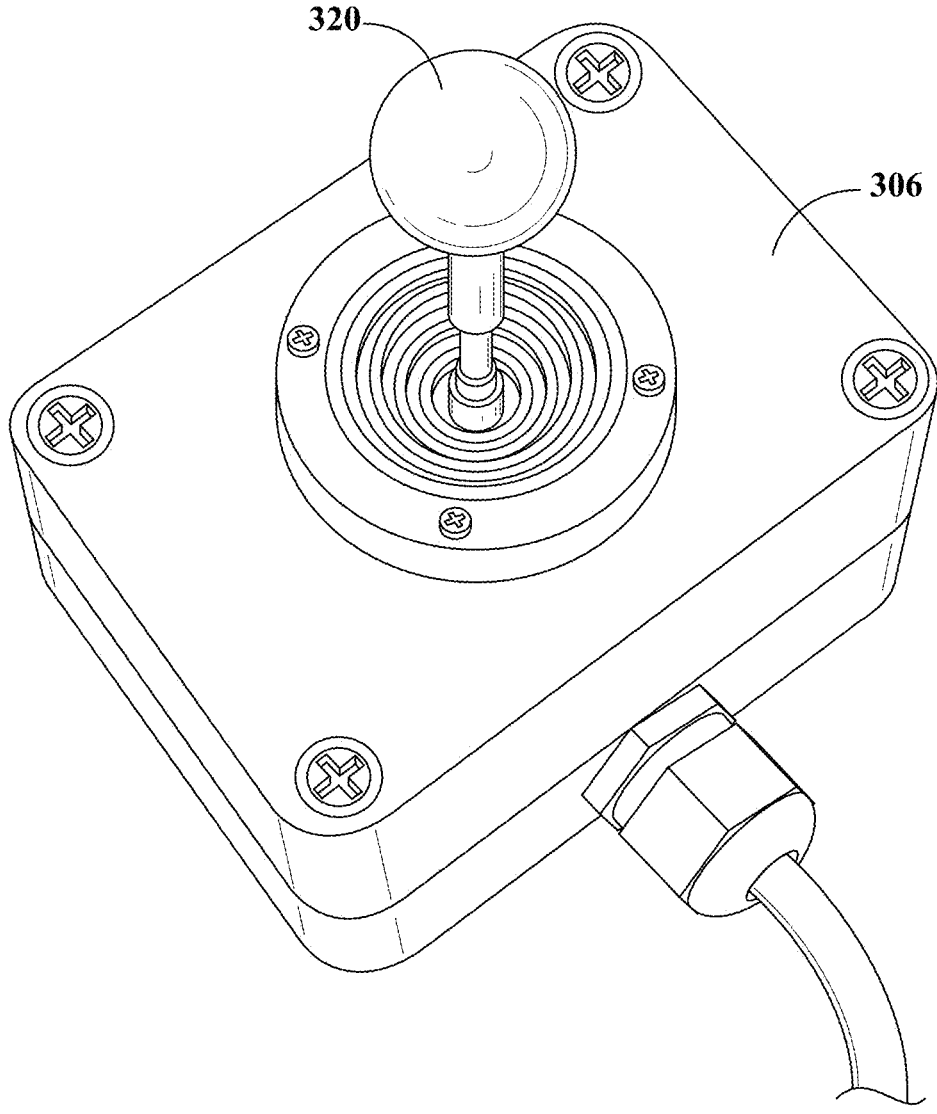

FIG. 3B is a perspective view of an input module of the configuration of the sensory substitution apparatus of FIG. 3A, according to an embodiment of the present disclosure.

Figure 3C:
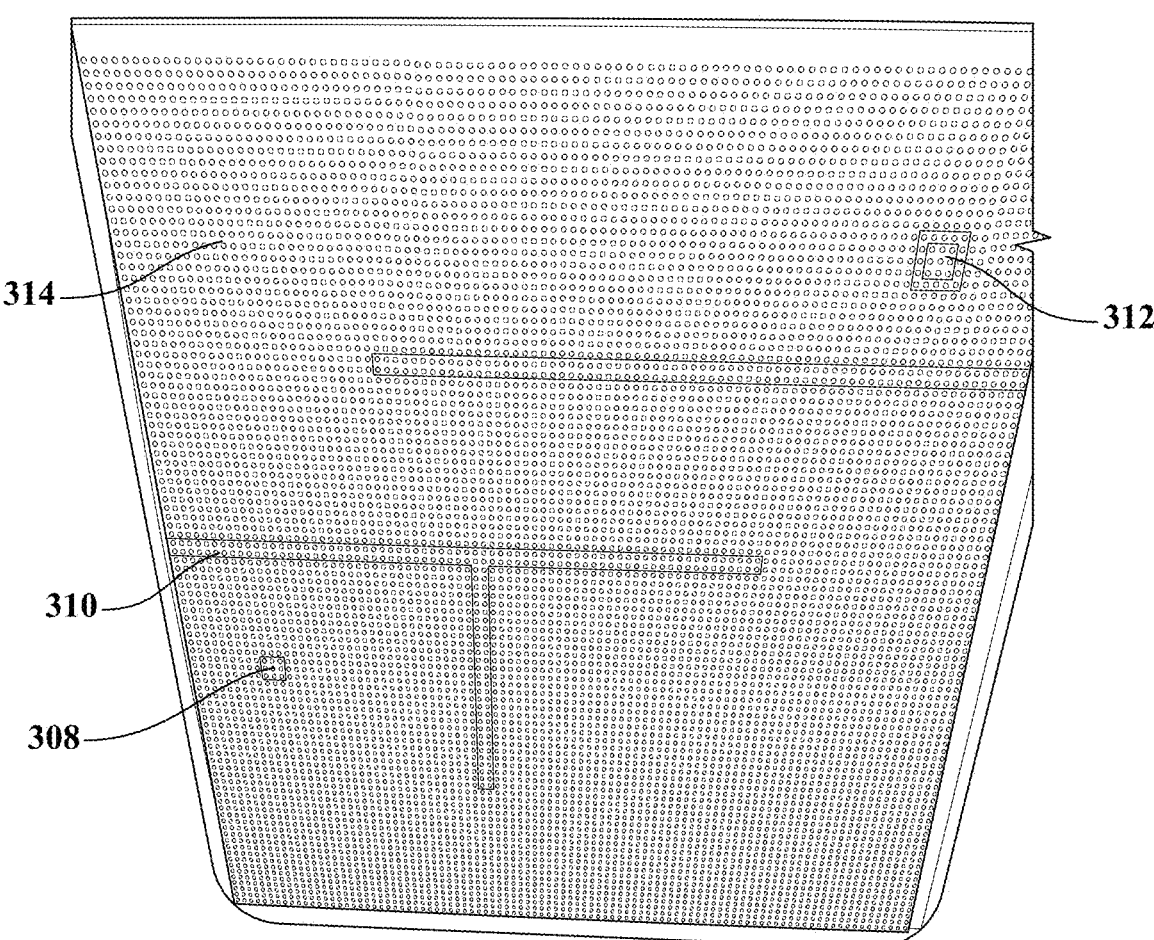

FIG. 3C is an alternative perspective view of the output module of the configuration of the sensory substitution apparatus of FIG. 3A, according to an embodiment of the present disclosure.

Figure 4A:
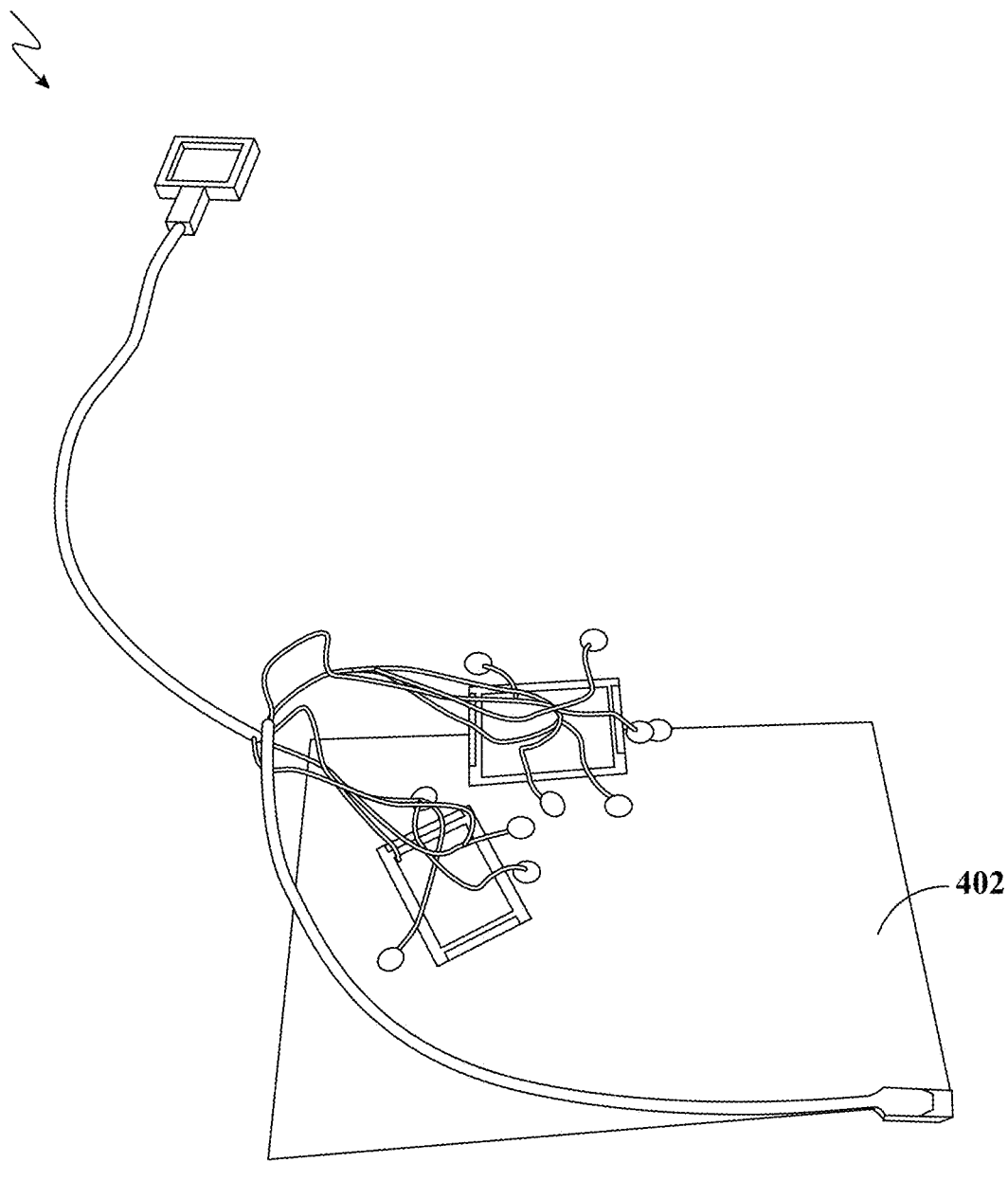

FIG. 4A is a perspective view of an input module of another alternative configuration of a sensory substitution apparatus, according to an embodiment of the present disclosure.

Figure 4B:
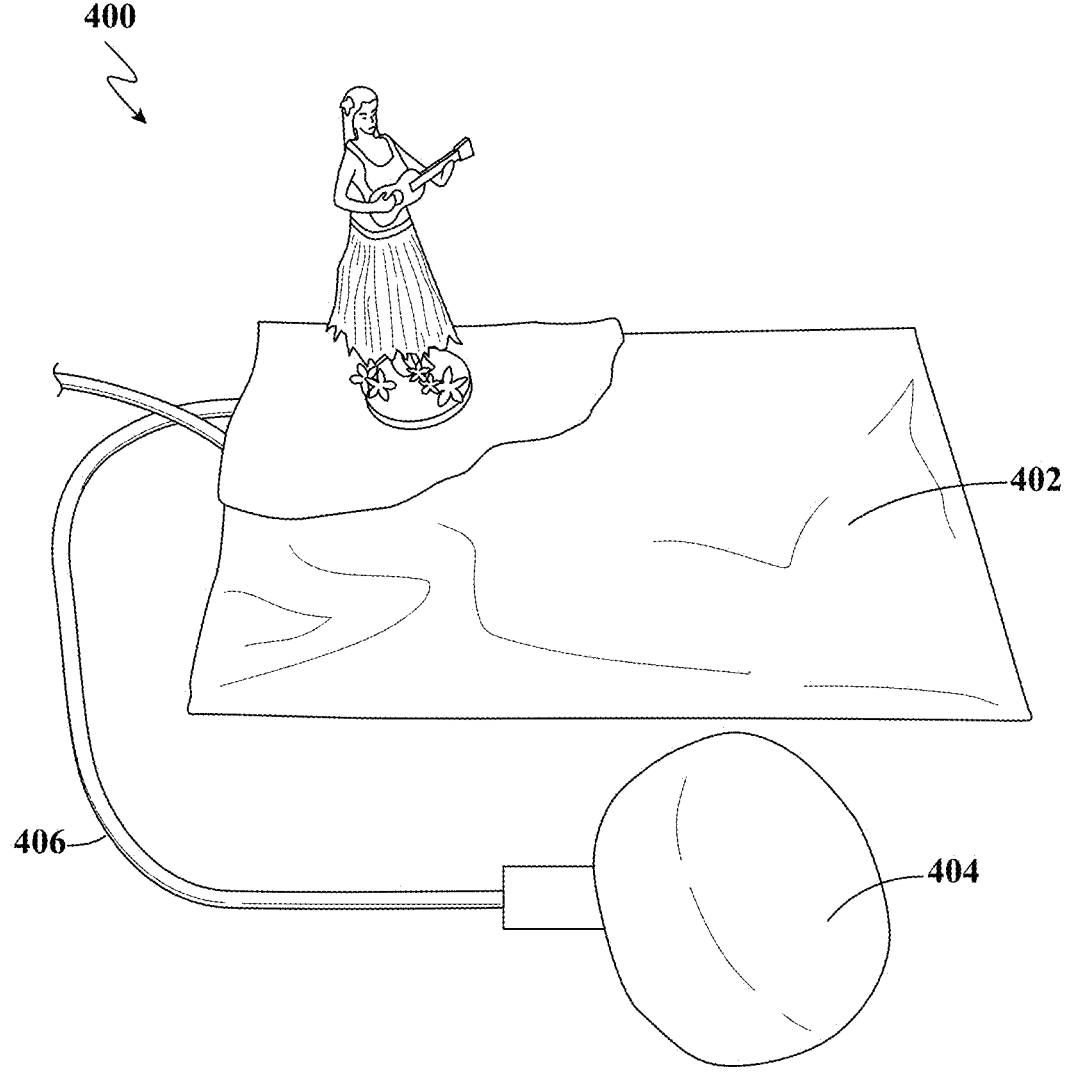

FIG. 4B is a perspective view of the configuration of the sensory substitution apparatus of FIG. 4A, according to an embodiment of the present disclosure.

Figure 4C:
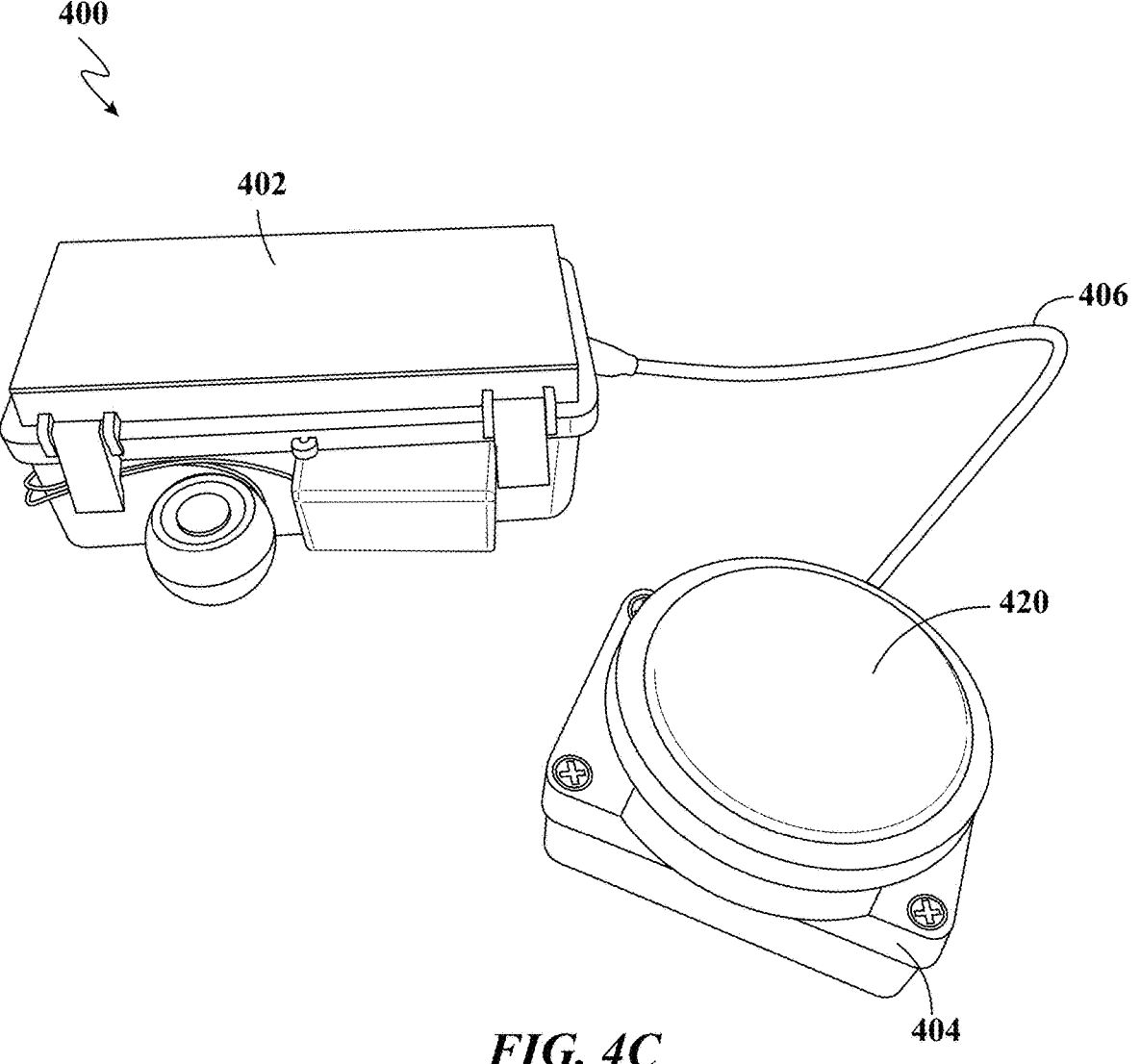

FIG. 4C is a perspective view of the configuration of the sensory substitution apparatus of FIG. 4A comprising an output module which provides both a tactile and an auditory sensory feedback response, according to an embodiment of the present disclosure.

Figure 4D:
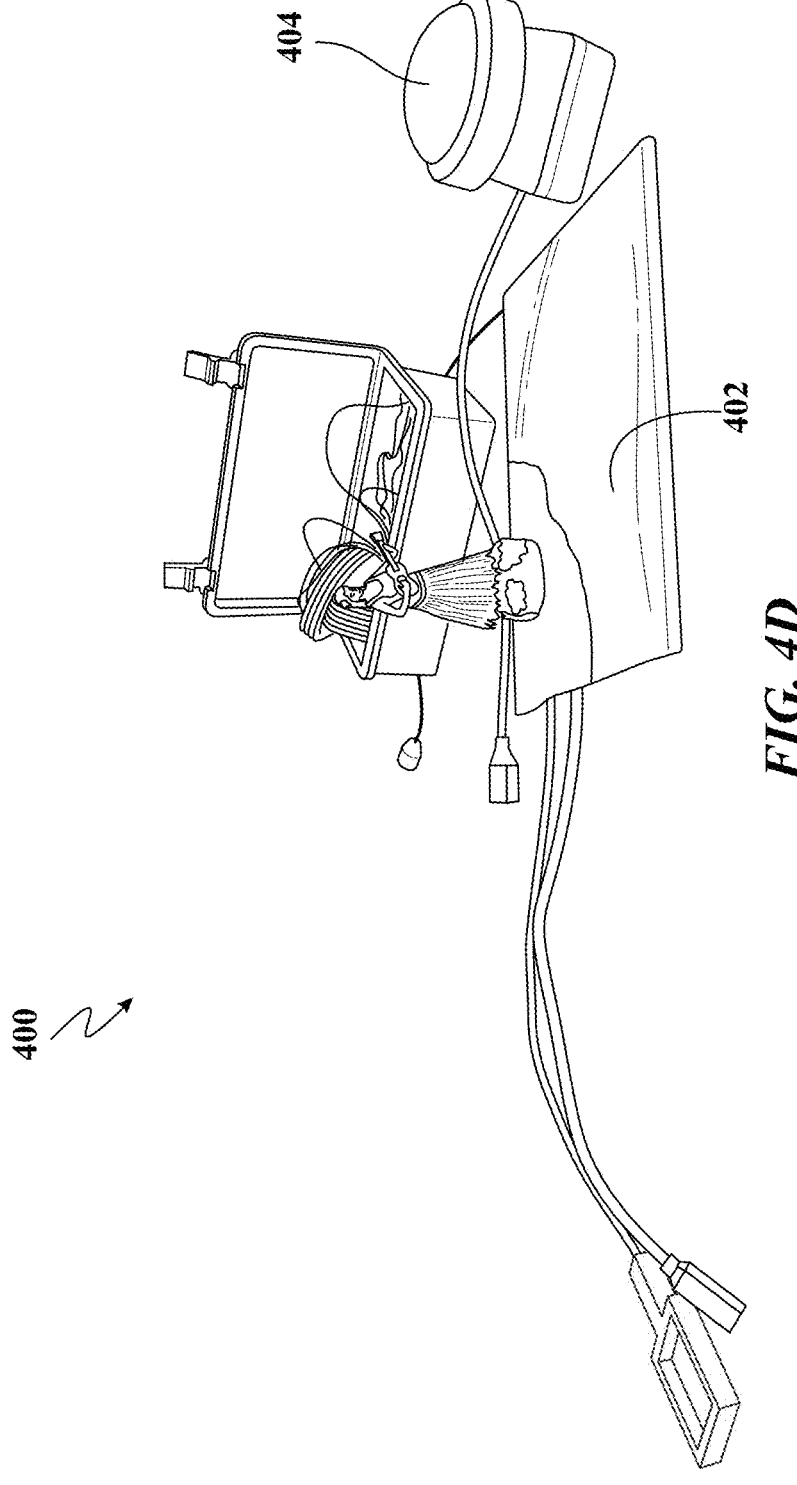

FIG. 4D is a perspective view of a configuration of the sensory substitution apparatus of FIG. 4A, which comprises both the output module of FIG. 4B and the output module of FIG. 4C, according to an embodiment of the present disclosure.

Figure 5:
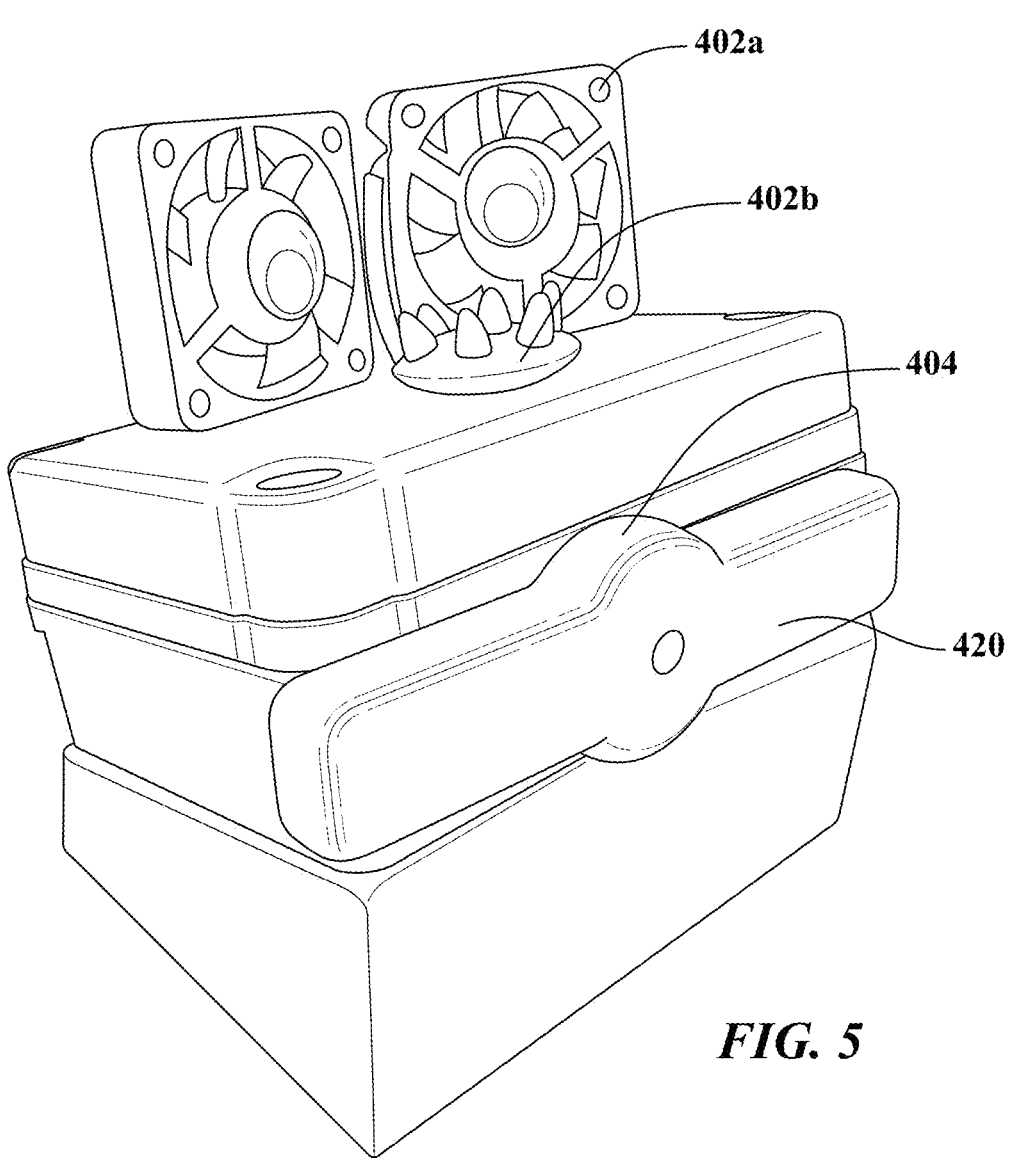

FIG. 5 is a perspective view of another alternative configuration of a sensory substitution apparatus, according to an embodiment of the present disclosure.

Figure 6:
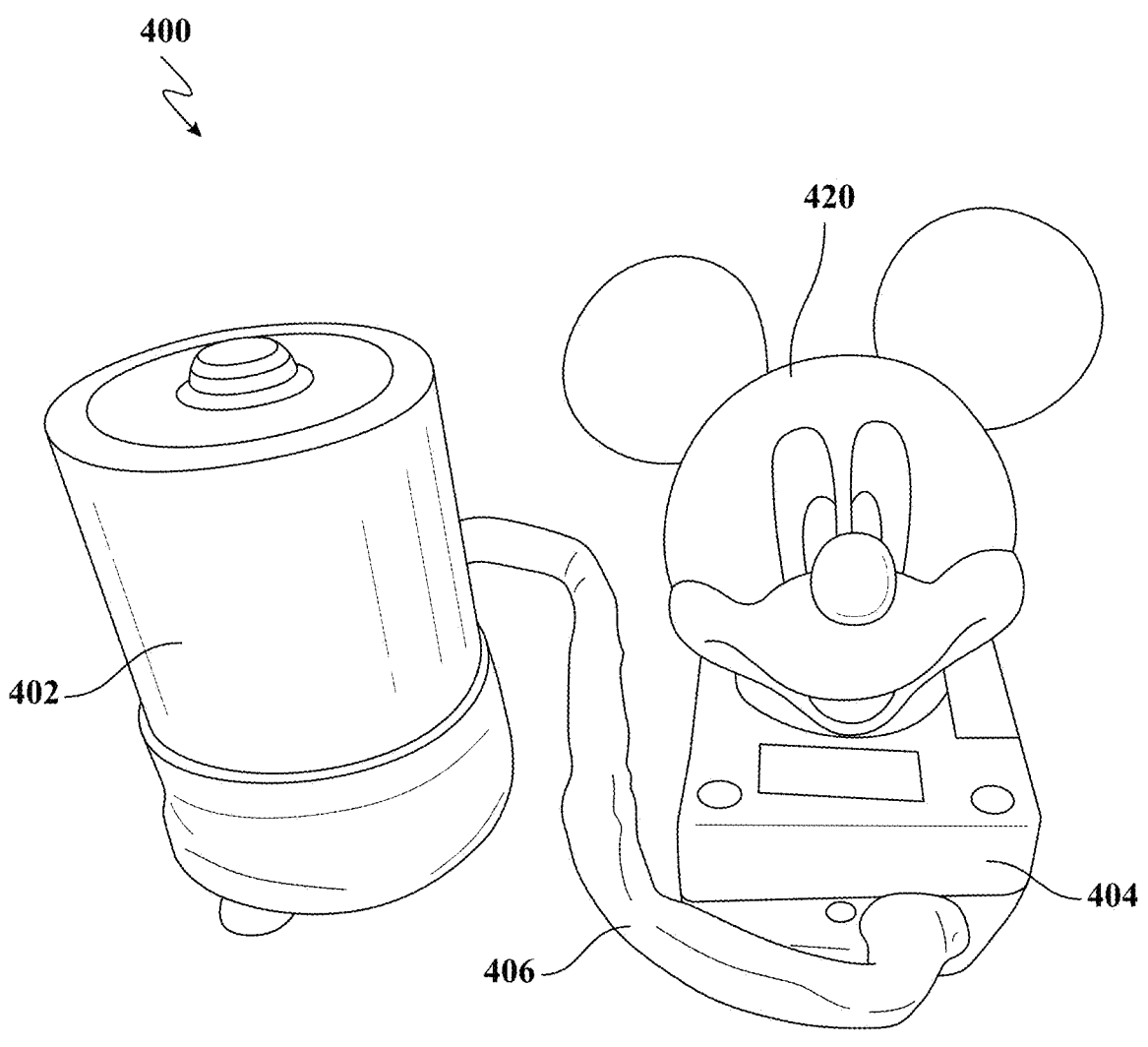

FIG. 6 is a perspective view of another alternative configuration of a sensory substitution apparatus, according to an embodiment of the present disclosure.

FIG. 7 is a flow chart depicting the steps of a method of using an exemplary configuration of a sensory substitution apparatus, according to an embodiment of the present disclosure.

FIG. 8 is a flow chart depicting the steps of a method of using an alternative configuration of a sensory substitution apparatus, according to an embodiment of the present disclosure.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention. Elements/components shown in diagrams are illustrative of exemplary embodiments of the disclosure and are meant to avoid obscuring the disclosure. Any headings, used herein, are for organizational purposes only and shall not be used to limit the scope of the description or the claims. Furthermore, the use of certain terms in various places in the specification, described herein, are for illustration and should not be construed as limiting.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in alternative embodiments," "in an alternative embodiment," or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items.

Definitions

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

As used herein, the terms "subject," "user," "individual," and "patient" refers to any organism known in the art which may engage with a device. As such, the subject, the user, the individual, and/or the patient may be humans, animals, insects, and/or single-celled organisms, and/or any humans and/or animals special developmental needs and/or recovering from a neurological, a physical impairment, and/or any condition known in the art that impacts any motor skill known in the art. For ease of reference, the exemplary embodiment described herein refers to a human with special developmental needs and/or recovering from the neurological, the physical impairment and/or any condition known in the art that impacts any motor skill of the human, but this description should not be interpreted as exclusionary of other humans, animals, and/or organisms.

As used herein, the term "communicatively coupled" refers to any coupling mechanism configured to exchange information (e.g., at least one electrical signal) using methods and devices known in the art. Non-limiting examples of communicatively coupling may include Wi-Fi, Bluetooth, wired connections, wireless connection, quantum, and/or magnets. For ease of reference, the exemplary embodiment described herein refers to Wi-Fi and/or Bluetooth, but this description should not be interpreted as exclusionary of other electrical coupling mechanisms.

As used herein, the term "electronic power source" refers to any electronic source known in the art which may provide power to a device. As such, the electronic power source may be a battery, a wind turbine, a solar panel, a plug and/or an outlet. For ease of reference, the exemplary embodiment, described herein, refers to a battery, but this description should not be interpreted as exclusionary of other power sources.

As used herein, the term "sensory feedback response" refers to any stimulus known in the art which may be received by a user and make the brain of the user aware of the body of the user. As such, the sensory feedback response may be intrinsic and/or extrinsic feedback, including but not limited to vision, audio, touch, pressure, pain, shock, smell, and/or taste. For ease of reference, the exemplary embodiment described herein refers to touch, vision, and/or audio, but this description should not be interpreted as exclusionary of other sensory feedback responses.

As used herein, the term "input module" refers to any device known in the art which allows a user to engage and/or provide an input to a system. As such, the input module may be a controller, a keyboard, a graphical user-interface, a sensor, and/or an accelerometer. For ease of reference, the exemplary embodiment described herein refers to a controller, and/or a sensor, but this description should not be interpreted as exclusionary of other devices known in the art which may allow a user to engage with an interface of a device.

As used herein, the term "interface" refers to any surface known in the art which allows the user to engage and/or provide an input to the input module. As such, the interface may be a touchpad, a joystick, a pressure pad, a button, a key, a yoke, a handle, and/or a lever. For ease of reference, the exemplary embodiment described herein refers to a handle, a joystick, a pressure pad, and/or a button, but this description but not be interpreted as exclusionary of other interfaces.

As used herein, the term "output module" refers to any device known in the art which may provide a user with a sensory feedback response, As such, the output module may be a fan, a graphic display of a computing device, a light, a thermal output (e.g., a cool and/or a warm temperature), a light array, a motor, a speaker, a smell, and/or a taste. For ease of reference, the exemplary embodiment described herein refers to a motor, a light, a graphic display of a computing device, a fan, and/or a speaker, but this description should not be interpreted as exclusionary other devices known in the art which may provide a user with a sensory feedback response.

As used herein, the term "haptic motor" refers to any device known in the art which may provide tactile feedback to a user. The haptic motor may be a vibratory disc motor, an actuator, an eccentric rotating mass vibration motor, a linear resonant actuator, and/or a piezo haptic sensor. For ease of reference, the exemplary embodiment described herein refers to at least one vibratory disc motor, but this description should not be interpreted as limiting to other haptic motors.

As used herein, the term "normal force" refers to any force known in the art which may be predetermined as a baseline (e.g., standardized) input for an interface. The normal force may refer to predetermined force applied to a pressure sensor, a pressure pad, a joystick, a button, a touchpad, a key, and/or a lever. For ease of reference, the exemplary embodiment described herein refers to a predetermined force for a pressure sensor, a joystick, a button, and a pressure pad, but this description should not be interpreted as limiting to other interfaces.

As used herein, the term "input signal" refers to any function known in the art which may convey information about a phenomenon. The input signal may be an electronic signal, a chemical signal, and/or a mechanical signal. For ease of reference, the exemplary embodiment described herein refers to an electronic signal, but this description should not be interpreted as limiting to other information conveying functions.

As used herein, the term "surface" refers to any region and/or space known in the art which may allow a user to traverse in order to perform an activity and/or orient the user, accordingly, in order to perform an activity. The surface may be a ground surface, a diagonal surface, an elliptic surface, a cylindric surface, a hyperbolic surface, a spherical surface, a wall, a hill, and/or a staircase. For ease of reference, the exemplary embodiment described herein refers to a ground surface (e.g., a floor), but this description should not be interpreted as limiting to other regions and/or spaces.

As used herein, the term "audio-based device" refers to any device known in the art which may output an acoustic sound. The audio-based device may be a speaker, sound card, onboard audio, external audio, tweeter, speaker, woofer, and/or subwoofer. For ease of reference, the exemplary embodiment described herein refers to a speaker, but this description should not be interpreted as limiting to other device configured to output an acoustic sound.

As used herein, the terms "about," "approximately," or "roughly" as used herein refer to being within an acceptable error range for the particular value as determined by one of ordinary skill in the art, which will depend in part on how the value is measured or determined (i.e., the limitations of a measurement system), (i.e., the degree of precision required for a particular purpose, such as producing a sensory substitution apparatus). As used herein, "about," "approximately," or "roughly" refer to within +15% of the numerical.

All numerical designations, including ranges, are approximations which are varied up or down by increments of 1.0, 0.1, 0.01 or 0.001 as appropriate. It is to be understood, even if it is not always explicitly stated, that all numerical designations are preceded by the term "about". It is also to be understood, even if it is not always explicitly stated, that the compounds and structures described herein are merely exemplary and that equivalents of such are known in the art and can be substituted for the compounds and structures explicitly stated herein.

Wherever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Wherever the term "no more than," "less than," or "less than or equal to" precedes the first numerical value in a series of two or more numerical values, the term "no more than," "less than" or "less than or equal to" applies to each of the numerical values in that series of numerical values. For example, less than or equal to 1, 2, or 3 is equivalent to less than or equal to 1, less than or equal to 2, or less than or equal to 3.

Sensory Substitution Apparatus

The present invention pertains to an apparatus and method for developmental and/or rehabilitative sensory substitution to augment at least one low-functioning and/or non-functioning senses in at least one user. The low-functioning and/or non-functioning senses of the user may include but are not limited to touch, sight, hearing, and/or any sense known in the art, which may be used to help improve input and output relationships for subjects suffering from deficiencies related to one or more senses. In an embodiment, the present invention may include a sensory substitution apparatus which may be configured to provide real-time feedback to an engagement of the apparatus which may be received from at least one user of the apparatus. As such, in some embodiments, the sensory substitution apparatus may be engaged by at least one user, at the same time, such that a sensory feedback response may be provided to the at least one user, in real-time. Additionally, in some embodiments, the sensory substitution apparatus may be powered via an electronic power source.

In this embodiment, the sensory substation apparatus may comprise an input module comprising at least one interface which may be clasped, pressed, and/or manipulable by any means known in the art by at least one user in order to perform at least one task provided by the sensory substitution apparatus. In this embodiment, the task may be designed to enhance development of sensory recognition by the user. Additionally, in this embodiment, the sensory substitution system may be used to augment low-functioning and/or non-functioning senses in an individual to focus attention on interacting with a different sense of the individual, such that the low-functioning and/or non-functioning sense may be developed and/or rehabilitated. Additionally, in an embodiment, the sensory substitution apparatus may comprise an output module. In this embodiment, the output module may be configured to provide at least one sensory feedback response to at least one user of the sensory substitution apparatus. In this manner, in this embodiment, the output module and/or the input module may be in electrical communication with a processor of the sensory substitution apparatus, such that the output module may be configured to provide a sensory feedback response which may be proportional to an engagement by the user on the at least one interface of the input module of the sensory substitution apparatus. Accordingly, in this embodiment, the output module may be configured to provide the sensory feedback in a manner as required, requested, or needed by the at least one user based on the physical and/or mental capacity of the at least one user.

Furthermore, in an embodiment, the sensory substitution apparatus may also comprise at least one proportional control, such that users of any developmental stage known in the art may be able to engage with the sensory substitution apparatus. For example, the user may comprise a baby, a child, a teenager, an adult, an elderly person, a developmentally disabled person, and/or any user known in the art comprising any age, size, and/or developmental stage known in the art. As such, in this embodiments, the sensory substitution apparatus may provide a new standard of care for individuals including but not limited to individuals with special needs and/or a developmental disability, and/or provide a new standard of car for individuals who may be recovering from a traumatic physical and/or mental injury, including but not limited to, the brain, spinal cord, muscle, and/or any injury known in the art which may impair movement and/or cognitive thought, regardless of an ability level and/or age of the user. In some embodiments, the sensory substitution apparatus may provide the user with an ability to interact naturally with at least one interface on the input module, which may then provide the user with a predetermined feedback, which may include a proportional and/or real-time feedback response, such that new pathways for brain development may be created for the user.

The apparatus and method will be described in greater detail in the section herein below.

In an embodiment, the sensory substitution apparatus may be hand operated. Additionally, in this embodiment, the sensory substitution apparatus may be configured to provide at least one sensory feedback response, including but not limited to visual, tactile, and/or auditory.

As shown in FIGS. 1A-2B, in an embodiment, the sensory substitution system may comprise a sensory substitution apparatus 100 comprising a housing 108 comprising a first end 102 opposite a second end 104, such that at least one input module may be disposed at first end 102 and/or second end 104. Accordingly, in this embodiment, the at least one input module may comprise an interface 106 which may be capable of being gripped, held, and/or manipulated any way known in the art by at least one user. Accordingly, as shown in FIGS. 1A-1B, in this embodiment, sensory substitution apparatus 100 may also include an outer casing, such that housing 108 may encase an electronic circuitry 120. In this embodiment, electronic circuitry 120 may be in electrical communication with the input module, a processor, and/or an output module of sensory substitution apparatus 100. Furthermore, in an embodiment, the input module may include but is not limited to an accelerometer, a proximity sensor, an occupancy sensor, a resonant actuator, and/or any sensor known in the art which may configured to monitor a movement of the user. In this manner, in this embodiment, the output module may include but is not limited to an illuminator, a haptic motor, and/or any device known in the art which may provide at least one user with a tactile, auditory, visual, and/or any sensory feedback response known in the art, based on an input provided by the at least one user. In this embodiment, the accelerometer may be configured to measure a normal distance of housing 108 of sensory substitution apparatus 100 with respect to the at least one user, and a predefined area. As used herein, the predefined area may refer to any distance known in the art which may be used to perform at least one task using sensory substitution apparatus 100. The predefined area may be a distance between housing 108 and the at least one user, a distance between a surface (e.g., a ground surface) and housing 108, and/or a distance required for the at least one user to perform a task with sensory substitution apparatus 100. For ease of reference, the exemplary embodiment described herein refers to the distance between housing 108 and the at least one user and/or housing 108 and the surface, but this description should not be interpreted as exclusionary of other distances.

Figure 1C:
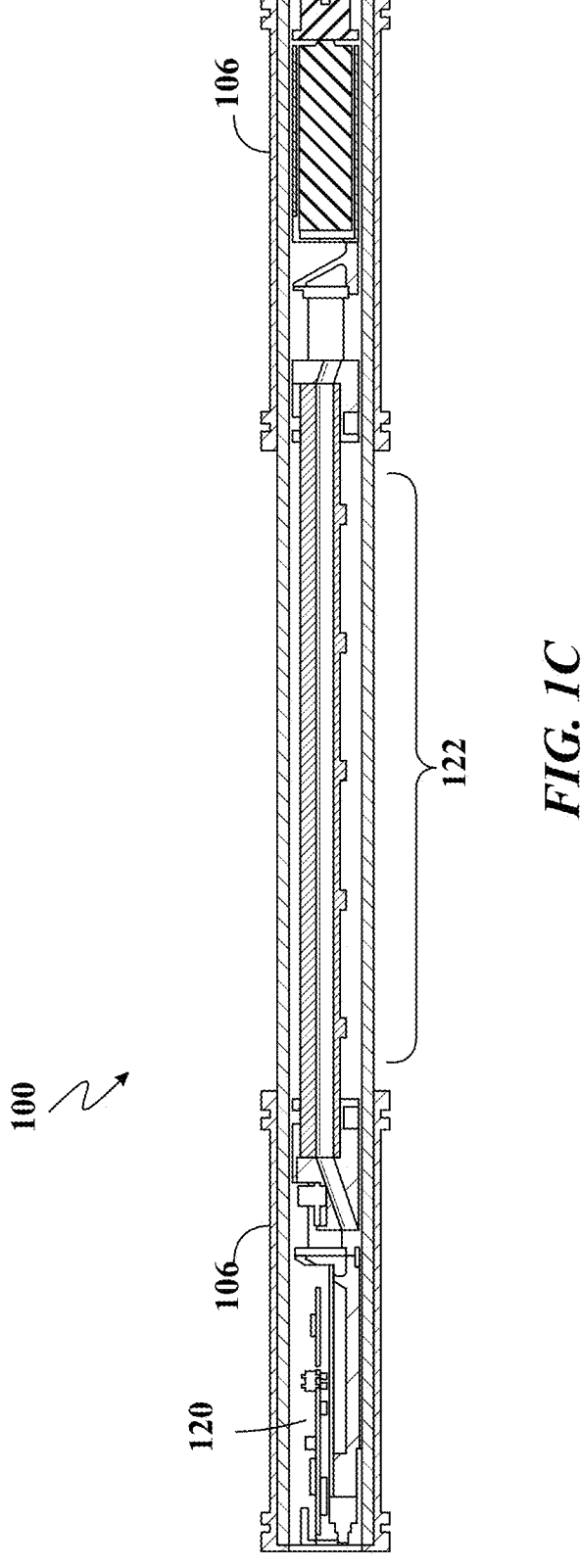
FIG. 1C is an alternative perspective view of the internal components of the configuration of the sensory substitution apparatus of FIG. 1A, according to an embodiment of the present disclosure.

Additionally, as shown in FIG. 1C, in an embodiment, the output module may comprise any sensor known in the art which may provide haptic, visual, and/or any sensory feedback known in the art to the at least one user and/or at least one light 122. Furthermore, in an embodiment, housing 108 of sensory substitution apparatus 100 may include at least one light 122, such that the at least one light 122 may be temporarily affixed to housing 108. Accordingly, at least one light 122 may be configured to be in electrical communication with the accelerometer and/or electronic circuitry 120. Accordingly, in this embodiment, the at least one light 122 may be configured to provide a sensory feedback to the at least one user including but not limited to illuminating at a predetermined and/or random intensity, illuminating intermittently at a predetermined and/or random rate of flash, variable intensity of illumination (e.g., starting at a maximum intensity of illumination and slowly decreasing the intensity, and/or starting at a minimum intensity of illumination and slowly increasing the intensity), and/or changing color of the illumination.

In an embodiment, at least one light 122 may be temporarily affixed within housing 108. In this manner, as shown in FIG. 2B, housing 108 may include a transparent portion, such that at least one light 122 may be viewable through the transparent portion of housing 108. In some embodiments, the at least one user may use sensory substitution apparatus 100 alone or in combination with a secondary apparatus, which may be in electrical communication therewith, including but not limited to a proportional balancer system, a virtual reality and/or augmented reality headset, a helmet which may be configured to monitor brain activity of the at least one user, a pad configured to be temporarily affixed to at least a portion of the at least one user, and/or any device known in the art which may be used in combination with sensory substitution apparatus 100.

Moreover, as shown in FIGS. 2A-2B, in an embodiment, at least one light 122 may be configured to illuminate based on data measured and captured by the input module via at least one interface 106 at first end 102 and/or second end 104 of housing 108. As such, at least one input signal based on the data measured and captured by the input module may be sent to the processor of sensory substitution apparatus 100, which subsequent to receiving the at least one input signal, may activate the output module to provide the sensory feedback response to the at least one user. For example, in this embodiment, as shown in FIG. 2B, the at least one light 122 may be in electronic communication with the input module, via electronic circuitry 120 and the processor. In this example, the input module may comprise an accelerometer, such that the accelerometer may configured to provide feedback on the at least one user based on a measured acceleration of sensory substitution apparatus 100 with respect to the at least one user. Accordingly, in this embodiment, at least one light 122 may be disposed in between first end 102 and second end 104 of sensory substitution apparatus 100.

In an embodiment, at least one light 122 may be disposed at a center point thereof between first end 102 and second end 104, and at least one alternative light 122 may be disposed in between the first end 102 and/or the second end 104 of sensory substitution apparatus 100 and the center point. Accordingly, in this embodiment, as the at least one raises and/or lowers sensory substitution apparatus 100, the processor may be configured to activate the output module, such that at least one light 122 may reflect a position of sensory substitution apparatus 100 with respect to the at least one user, such that sensory substitution apparatus 100 may be configured to provide the sensory feedback response, visually, with respect to a location of the instruction using sensory substitution apparatus 100. In some embodiments, sensory substitution apparatus 100, may be configured to provide sensory feedback proportional to the engagement of the user detected by the input module, and/or may provide the sensory feedback in real-time based on the engagement of the at least one user detected by the input module. As such, in these other embodiments, the processor may be configured to increase and/or decrease an electronic current to the output module based on the changes in a normal force applied to sensory substitution apparatus applied to at least one interface 106 or detected by at least one sensor of the input module and/or changes in the normal distance in relation to housing 108 and the at least one user and/or the predefined area.

Furthermore, in an embodiment, sensory substitution apparatus 100 may be configured to provide feedback related to the balance of sensory substitution apparatus 100, thereby developing the user's balance-based development. In this embodiment, sensory substitution apparatus 100, may be configured to provide feedback such that the feedback may be proportional to the input of the user and/or is provided in real-time based on the engagement of the at least one user as detected by the sensory substitution apparatus 100.

For example, as shown in FIGS. 2A-2B, in an embodiment, if the sensory substitution apparatus 100 is tilted by the user in a direction toward the first end 102 and/or the second end 104, the at least one light 122 of the output module may be configured to provide sensory feedback to the at least one user regarding a balanced position of sensory substitution apparatus 100. Accordingly, in this embodiment, the at least one light 122 may be configured to provide feedback in real-time to the at least one user based on the amount of tilt provided by the at least one user. Furthermore, in this example, a default position of the sensory substitution apparatus 100 may comprise sensory substitution apparatus 100 configured to be disposed parallel to the surface such that no angle may be formed therebetween. As such, in this example, only a central light of the at least one light 122 may be illuminated, noting an alignment between sensory substitution apparatus 100 and the surface. However, as the input module of sensory substitution apparatus 100 detects a tilt, via at least one sensor, caused by the user, as the user engages with at least one interface 106, in a direction toward the first end 102 and/or the second end 104, the at least one light and/or the at least one alternative light of the at least one light 122 may be configured to be illuminated in the direction the input module of sensory substitution apparatus 100 detects is being tilted by the user. In addition, in this embodiment, as sensory substitution apparatus 100 forms a greater angle with respect to the surface, at least one, light, at least one alternative light, and/or at least one additional alternative light 122 may be configured to be illuminated to reflect the increased angle, thereby providing the sensory feedback of the misalignment, via visual feedback, between sensory substitution apparatus 100 and the surface.

In this manner, in an embodiment, the output module may be configured to provide an auditory feedback response via the output module, alone or in addition to visual feedback provided by at least one light 122 and/or a haptic feedback response, as the sensory feedback response to the at least one user based on the alignment and/or misalignment of sensory substitution apparatus 100 with regards to the surface. As such, in this embodiment, the output module of sensory substitution apparatus 100 may comprise a any audio-based device known in the art which may play and/or stop a sound from being output. For example, when the sensory substitution apparatus 100 may be aligned, the output module of sensory substitution apparatus 100 may be configured to provide auditory feedback via an acoustic sound, including but not limited to a beep, a chirp, and/or at least one musical note, from the output module of sensory substitution apparatus 100, and/or when sensory substitution apparatus 100 is misaligned, the output module of sensory substitution apparatus 100 may be configured to inhibit all acoustic sounds, provide a predetermined acoustic sounds, provide a periodic acoustic sound at a predetermined and/or random rate of frequency, and/or provide a higher and/or decreased decibel level of acoustic sound of during a tilt of sensory substitution apparatus 100. In this embodiment, the acoustic sound may be expressed by at least one audio-based device disposed about and/or within at least a portion of housing 108 of sensory substitution apparatus 100, and/or secondary apparatus. Furthermore, in this embodiment, the at least one audio-based device may be in electrical communication with electronic circuitry 120 and/or the processor disposed within housing 108.

Additionally, in an embodiment, the output module of sensory substitution apparatus 100 may also be configured to provide tactile and/or haptic feedback alone or in addition to visual feedback provided by at least one light 122 and/or auditory feedback provided by at least one audio-based device of the output module, as the sensory feedback response to the at least one user based on the alignment and/or misalignment of sensory substitution apparatus 100 with regards to the surface. For example, when the sensory substitution apparatus 100 may be aligned, the output module of sensory substitution apparatus 100 may be configured to provide haptic feedback via a smooth vibration of housing 108, and/or when sensory substitution apparatus 100 is misaligned, the output module of sensory substitution apparatus 100 may be configured to inhibit all vibration, provide a predetermined vibration, provide a pulsed vibration at a predetermined and/or random rate of frequency, and/or provide a higher and/or decreased intensity of vibration of housing 108 during a tilt of sensory substitution apparatus 100. In this embodiment, the vibration of housing 108 may be actuated by at least one haptic motor. Furthermore, in this embodiment, the at least one haptic motor may be in electrical communication with electronic circuitry 120 and/or the processor disposed within housing 108.

Accordingly, the at least one haptic motor (e.g., a 12 mm coin vibrating motor) may be actuated based on the alignment and/or misalignment of housing 108 of sensory substitution apparatus 100 with respect to the surface. For example, in an embodiment, the at least one haptic motor may be disposed in a position, including but not limited to first end 102, second end 104, at the least one interface 106, the center of housing 108, and/or within or disposed upon the secondary apparatus in electronic communication with sensory substitution apparatus 100 such that the at least one user may be provided haptic feedback as they are engaged with at least one interface 106. Moreover, in this embodiment, the secondary apparatus may comprise a pad, which may be temporarily affixed to the at least one user, such that the haptic response may be provided to at least a portion of the at least one user, allowing the at least one user to receive the haptic feedback conforming to the needs and/or requirements of the at least one user.

Furthermore, in this embodiment, the at least one haptic motor may be configured to provide the haptic feedback to the at least one user, in real-time. In some embodiments, the processor may be configured to increase and/or decrease the electronic current supply to the at least one haptic motor of the output module, such that the at least one haptic motor may an adjustable magnitude of vibration based on the orientation of housing 108, with respect to the surface. As such, it should be appreciated, in this example, that other components for providing a haptic feedback via housing 108 may be used, such as an off-balance flywheel, linear actuation (e.g., a solenoid), a cam-driven mechanism, and/or other mechanical and electrical components known within the art to output a haptic feedback.

Additionally, in some embodiments, the processor may be configured to activate the output module, such that the at least one haptic motor may be configured to provide the tactile and/or haptic feedback to the at least one user for the following reasons, including but not limited to a predetermined amount of idle time passing, failing to perform the exercise and/or activity within a specified amount of time, and/or when the output module comprises the secondary apparatus, when the at least one user drops sensory substitution apparatus 100. In these other embodiments, the processor may also be configured to activate the output module, such that the at least one light 122 may be configured to provide a visual feedback to the at least one user for the following reasons, including but not limited to a predetermined amount of idle time passing, failing to perform the exercise and/or activity within a specified amount of time, and/or when the output module comprises the secondary apparatus, when the at least one user drops sensory substitution apparatus 100. Accordingly, in these other embodiments, the output module may be configured to activate both the at least one haptic motor and the at least one light 122, such that the at least one user may receive both a tactile, haptic, and/or visual sensory feedback response.

In some embodiments, the processor may be in electrical communication with at least one computing device and/or database. As such, in these other embodiments, sensory substitution apparatus 100 may comprise a memory, such that the processor may be configured to load the at least one input from the at least one user received at the at least one interface 106 of the input module of sensory substitution apparatus 100. Accordingly, once the memory of sensory substitution apparatus 100 receives the at least one input of the at least one user, the processor may be configured to transmit the at least one input to the at least one computing device and/or database. As such, the processor may be configured to electronically communicate with the at least one computing device via Bluetooth, Wi-Fi, ethernet, USB-port, and/or any electronic communication method known in the art. Furthermore, in these other embodiments, based on the information received by the at least one computing device and/or database, the processor may be configured to receive predetermined and/or periodical updates based upon the at least one input of the at least one user received at the at least one interface 106 of the input module of sensory substitution apparatus 100.

Accordingly, in some embodiments, these predetermined and/or periodical updates may include but are not limited to less strenuous activities and/or exercises, less time intensive activities and/or exercises, decreased sensory feedback response, increased strenuous activities and/or exercises, increased time intensive activities and/or exercises, increased sensory feedback response, decreased sensitivity of the at least one user interface 106 of the input module, and/or increased sensitivity of the at least one user interface 106 of the input module, additional activities and/or exercises the at least one user may perform with sensory substitution apparatus 100, additional challenges during at least one activity and/or exercise and/or at least one additional and/or fewer requirement to complete the at least one activity and/or exercise, which may be performed by the at least one user using sensory substitution apparatus 100 based on the data provided.

Moreover, in some embodiments, at least one user may select, adjust, and/or input the following including but not limited to the sensitivity level of the at least one user interface 106 of the input module of sensory substitution apparatus 100, activities and/or exercises comprising varying difficulty based on time intensity and/or strain, and/or the sensory feedback response provided by the output module of sensory substitution apparatus 100, such that the user may increase or decrease the sensory substitution feedback response based on preference. For example, if the at least one user is able to maintain the alignment of housing 108 of sensory substitution apparatus 100 throughout the at least one activity and/or exercise, the processor may be configured to increase a sensitivity of at least one interface 106 of the input module of sensory substitution apparatus 100. Accordingly, in this example, any slight deviation in alignment may be detected by at least one interface 106, such that a sensory feedback response (e.g., haptic, visual, and/or auditory) may be provided to the at least one user. In this manner, the at least one user may avoid stagnating and/or may increase the ability to develop and/or rehabilitate to perform the at least one activity and/or exercise the at least one low-functioning and/or non-functioning senses of the at least one user, while using sensory substitution apparatus 100.

In this same manner, in some embodiments if the processor of sensory substitution apparatus 100 detects continued sensory feedback responses (e.g., haptic, visual, and/or auditory) by sensory substitution apparatus 100 and/or the at least one input of the at least one user at the at least one user interface 106 of the input module of sensory substitution apparatus 100, the processor may be configured to transmit this data to the at least one computing device and/or database.

Moreover, in some embodiments, at least one user may select, adjust, and/or input the following including but not limited to the sensitivity level of the at least one user interface 106 of the input module of sensory substitution apparatus 100, activities and/or exercises comprising varying difficulty based on time intensity and/or strain, and/or the sensory feedback response provided by the output module of sensory substitution apparatus 100, such that the user may increase or decrease the sensory substitution feedback response based on preference. As such, in these other embodiments, the at least one computing device may configured to provide predetermined and/or periodical updates to sensory substitution apparatus 100, such that the activities, exercises, and/or sensory substitution apparatus 100 may comprise the following, including but not limited to, less strenuous exercises, less time intensive exercises, decreased sensory feedback response, increased sensory feedback response, decreased sensitivity of the at least one user interface 106 of the input module, and/or increased sensitivity of the at least one user interface 106 of the input module. For example, if the at least one user is unable to maintain the alignment of housing 108 of sensory substitution apparatus 100 throughout the at least one activity and/or exercise, the processor may be configured to decrease a sensitivity of at least one interface 106 of the input module of sensory substitution apparatus 100. Accordingly, in this example, an increased deviation in alignment is required to be detected by at least one interface 106, such that a sensory feedback response (e.g., haptic, visual, and/or auditory) may be provided to the at least one user. In this manner, the at least one user may require additional time to progress and/or begin to increase the ability to develop and/or rehabilitate to perform the at least one activity and/or exercise the at least one low-functioning and/or non-functioning senses of the at least one user, while using sensory substitution apparatus 100.

Moreover, as shown in FIGS. 3A-3C, in another embodiment, the sensory substitution apparatus may comprise a graphic computing display providing at least one sensory feedback response, including but not limited to haptic/tactile, visual, and/or auditory, described herein below.

Accordingly, as shown in FIGS. 3A-3C, in this embodiment, the output module of sensory substitution apparatus 300 may include a background 302 and at least one light 304, which may be arranged in any formation known in the art. For example, the at least one light 304 may be arranged in straight lines (e.g., strips of lights). As shown in FIG. 3A in particular, a contrast may be formed between the at least one light 304 and background 302, such that aid in the sensory feedback response provided to the at least one user may be a visual feedback. For example, in this embodiment, background 302 may be black, while the at least one light 304 may be configured to be white, yellow, and/or any color known in the art which may contrast with the color, black, such that the at least one light 304 may contrast with the black background 302. Additionally, as shown in FIG. 3B in an embodiment, sensory substitution apparatus 300 may also comprise an input module 306 having at least one interface 320 configured to be in electrical communication with the at least one light 304. In this embodiment, at least one interface 320 may include, but is not limited to a joystick, a pressure pad, and/or at least one button. As used herein, the term "at least one light 304" refers to any illuminator known in the art which may be used to light an enclosed area, an area within an outdoor environment, and/or a computing device display. For ease of reference, the exemplary embodiment described herein, refers to a light emitting diode (hereinafter "LED"), but this description should not be interpreted as limiting to other illuminators.

Accordingly, in this embodiment, when at least one interface 320 of input module 306 is engaged by the at least one user, at least one input signal may be outputted by input module 306 to the processor of sensory substitution apparatus 300. As such, the processor may then activate output module, such that at least a portion of the at least one light 304 may be illuminated in a proportional visual feedback response. In this manner, the illumination of the at least one light 304 may change in speed and/or direction based on the increase and/or decrease of the normal force, as provided by the at least one user to at least one interface 320 of input module 306 as the at least one user engages the at least one interface 320. For example, input module 306 and/or at least one interface 320 may comprise a pressure sensor and/or any sensor known in the art which may be configured to detect a force and direction as inputted by a user. Therefore, the speed may increase as the user provides an increasingly harder force, with respect to the normal force, to at least one interface 320 of input module 306, and the speed may decrease as the user provides a lighter force with respect to the normal force, to the at least one interface 320 of input module 306. Moreover, in an embodiment, the at least one light 304 of the output module may be arranged in strips which may be substantially horizontal and/or vertical, such that the output module of sensory substitution apparatus 300 may provide a rectangular track of at least one light 304 illumination. Additionally, it should be appreciated that alternative tracks and paths of lights 304 may be contemplated for sensory substitution apparatus 300 including radial, diagonal, and/or any direction known in the art which at least one light may create a track.

Referring to FIG. 3C, in an embodiment, the output module of sensory substitution apparatus 300 may be configured such that it may provide a visual feedback output in response to an engagement by the at least one user on at least one interface 320 of input module 306. As such, input module 306 may be configured to be in electronic communication with the processor and/or with the at least one light 304 of the output module. Moreover, in an embodiment, input module 306 may be configured to transmit at least one input signal based on the engagement by the user with the at least one interface 320 to the processor, such that the output module may be activated which subsequently activates the at least one moveable dot 308, which may comprise at least one light 304. Furthermore, in some embodiments, at least one moveable dot 308 may comprise at least one light 304, having a range of at least 1×1 block of lights to at least 10,000×10,000 block, encompassing every integer in between. In this manner, array 314 may comprise at least one light 304, having a range of at least 1×1 block of lights to at least 1,000,000 block of lights, encompassing every integer in between. For example, in an embodiment, the at least one moveable dot 308 may comprise a 9×9 block of lights 304. In addition, in this embodiment, the 9×9 block of lights 304 may be configured to be displayed on an array 314 of at least one light 304 of a greater size, such as a 96×96 light array 314. Accordingly, in this embodiment, at least one light 304, the at least one moveable dot 308, and/or the light array 314 may comprise variable colors, such that the at least one user may be able to distinguish the at least one moveable dot 308 from the at least one light 304 and/or the light array 314.

In another example, based on the engagement detected at the at least one interface 320 by input module 306, input module 306 may transmit at least one input signal to the processor. Accordingly, subsequent to receiving the at least one input signal from input module 306, the processor may be configured to activate the output module, such that movable dot 308 may be configured to translate within the array 314 as displayed on sensory substitution apparatus 300, with varying speed and/or direction proportional to a magnitude of force detected via input module 306 by the at least one user on the at least one interface 320, as compared to the normal force recognized by the at least one interface 320. Additionally, in some embodiment, the speed and/or direction of at least one moveable dot 308 may be randomized based on the magnitude of force detected via input module 306 by the user on the at least one interface 320, as compared to the normal force recognized by at least one interface 320. As shown in FIG. 3B, the at least one interface 320 may also be configured for 360° movement, such that movable dot 308 of the output module may be capable of 360° movement about the array 314. As such, sensory substitution apparatus 300, as shown in FIG. 3C, may be configured to translate the at least one moveable dot 308 to the at least one target 312 around the at least one obstacle 310.

In some embodiments, as shown in FIG. 3C, at least one obstacle 310 may be displayed on the array 314, as well as at least one target 312. Accordingly, the at least one user may engage with the at least one interface 320 of input module 306, such that at least one moveable dot 308 may be configured to move proportional to the force detected by at least one interface 320 and/or input module 306 as compared to the normal force recognized by at least one interface 302 and/or input module 306. Moreover, output module may comprise at least one haptic motor, at least one audio-based device, and/or at least one light 304 disposed within at least a portion of at least one interface 320, input module 306, the output module, and/or the secondary apparatus. Furthermore, in these other embodiments, the at least one interface 320 may be configured to provide a visual, tactile, and/or auditory feedback based on the force detected by at least one interface 320 and/or input module 306. Accordingly, if the at least one user directs at least one moveable dot 308 toward at least one obstacle 310, such that at least one moveable dot 308 contacts at least one obstacle 310, the output module may be configured to output a tactile, auditory, and/or visual feedback, such that the at least one user may recognize that the did not accomplish the objective of directing the at least one moveable dot 308 to target 312. As such, in some embodiments, the at least one haptic motor may be configured to provide the haptic feedback to the at least one user, in real-time.

In some embodiments, the processor may be configured to increase and/or decrease the electronic current supply to the at least one haptic motor of the output module, such that the at least one haptic motor may comprise an adjustable and/or proportional magnitude of vibration based on the direction and/or force applied to the at least one user interface 320 recognized by the at least one user interface 320 and/or input module 306. In this manner, the at least one user interface 320 and/or input module 306 may compare the force provided by the at least one user on the at least one user interface 320 to the normal force, as predetermined by input module 306, such that the sensory feedback provided to the user may be proportional to the difference between the two forces. Additionally, the output module may be configured to provide a haptic feedback when the at least one moveable dot 308 contacts target 312, based on the speed and/or direction of force applied by the at least one user to the at least one user interface 320 of input module 306. In addition, in some embodiments, the output module may be configured to activate the at least one haptic motor, such that the at least at least one haptic motor may be configured to provide a proportional tactile feedback to the at least one user for the following reasons, including but not limited to a predetermined amount of idle time passing, failing to contact at least one moveable dot 308 with target 312 within a specified amount of time, and/or when the output module comprises the secondary apparatus, when the at least one user drops input module 306 of sensory substitution apparatus 300.

Moreover, in these other embodiments, the output module may be configured to activate the at least one light 304, such that the at least one light 304 may be configured to provide a proportional visual feedback to the at least one user for the following reasons, including but not limited to the speed and/or direction of force applied by the at least one user to the at least one user interface 320, when at least one moveable dot 308 contacts at least one obstacle 310, at least one moveable dot 308 contacts target 312, a predetermined amount of idle time passing, failing to contact at least one moveable dot 308 with target 312 within a specified amount of time, and/or when the output module comprises the secondary apparatus, when the at least one user drops input module 306 of sensory substitution apparatus 300.

Furthermore, in these other embodiments, the output module may be configured to activate the at least one audio-based device, such that the at least one audio-based device may be configured to provide an auditory feedback to the at least one user for the following reasons, including but not limited to, based on the speed and/or direction of force applied by the at least one user to the at least one user interface 320, when at least one moveable dot 308 contacts at least one obstacle 310, at least one moveable dot 308 contacts target 312, a predetermined amount of idle time passing, failing to contact at least one moveable dot 308 with target 312 within a specified amount of time, and/or when the output module comprises the secondary apparatus, when the at least one user drops input module 306 of sensory substitution apparatus 300. Additionally, in these other embodiments, the auditory feedback response may comprise a beep, a chirp, at least one musical note, and/or any acoustic sound known in the art.

In some embodiments, the processor may be in electrical communication with at least one alternative computing device and/or database. As such, in these other embodiments, sensory substitution apparatus 300 may comprise a memory, such that the processor may be configured to load the at least one input from the at least one user received at the at least one interface 320 of input module 306 of sensory substitution apparatus 300. Accordingly, once the memory of sensory substitution apparatus 300 receives the at least one input of the user, the processor may be configured to transmit the at least one input to the at least one alternative computing device and/or database. As such, the processor may be configured to electronically communicate with the at least one alternative computing device via Bluetooth, Wi-Fi, ethernet, USB-port, and/or any electronic communication method known in the art. Furthermore, in these other embodiments, based on the information received by the at least one alternative computing device and/or database, the processor may be configured to receive predetermined and/or periodical updates based upon the at least one input of the at least one user received at the at least one interface 320 of input module 306 of sensory substitution apparatus 300.

Accordingly, in some embodiments, these predetermined and/or periodical updates may include but are not limited to less strenuous activities and/or exercises, less time intensive activities and/or exercises, decreased sensory feedback response, increased strenuous activities and/or exercises, increased time intensive activities and/or exercises, increased sensory feedback response, decreased sensitivity of the at least one user interface 320 of input module 306, and/or increased sensitivity of the at least one user interface 320 of input module 306, additional activities and/or exercises the at least one user may perform with sensory substitution apparatus 300, additional challenges during at least one activity and/or exercise and/or at least one additional and/or fewer requirement to complete the at least one activity and/or exercise, which may be performed by the at least one user using sensory substitution apparatus 300 based on the data provided.

Moreover, in some embodiments, at least one user may select, adjust, and/or input the following including but not limited to the sensitivity level of the at least one user interface 320 of input module 306 of sensory substitution apparatus 300, activities and/or exercises comprising varying difficulty based on time intensity and/or strain, and/or the sensory feedback response provided by the output module of sensory substitution apparatus 300, such that the user may increase or decrease the sensory substitution feedback response based on preference. For example, if the at least one user is able to contact target 312 with at least one moveable dot 308 throughout the at least one activity and/or exercise, the processor may be configured to increase a sensitivity of at least one interface 320 of input module 306 of sensory substitution apparatus 300. Accordingly, in this example, any slight deviation in the normal force as predetermined by input module 306 of sensory substitution apparatus 300 may be detected by at least one interface 320, such that a sensory feedback response (e.g., haptic, visual, and/or auditory) may be provided to the at least one user. In this manner, the at least one user may avoid stagnating and/or may increase the ability to develop and/or rehabilitate to perform the at least one activity and/or exercise the at least one low-functioning and/or non-functioning senses of the at least one user, while using sensory substitution apparatus 300.

In this same manner, in some embodiments if the processor of sensory substitution apparatus 300 detects continued sensory feedback responses (e.g., haptic, visual, and/or auditory) by sensory substitution apparatus 300 and/or the at least one input of the at least one user at the at least one user interface 320 of input module 306 of sensory substitution apparatus 300, the processor may be configured to transmit this data to the at least one alternative computing device and/or database.

Moreover, in some embodiments, at least one user may select, adjust, and/or input the following including but not limited to the sensitivity level of the at least one user interface 320 of input module 306 of sensory substitution apparatus 300, activities and/or exercises comprising varying difficulty based on time intensity and/or strain, and/or the sensory feedback response provided by the output module of sensory substitution apparatus 300, such that the user may increase or decrease the sensory substitution feedback response based on preference. As such, in these other embodiments, the at least one alternative computing device may configured to provide predetermined and/or periodical updates to sensory substitution apparatus 300, such that the activities, exercises, and/or sensory substitution apparatus 300 may comprise the following, including but not limited to, less strenuous exercises, less time intensive exercises, decreased sensory feedback response, increased sensory feedback response, decreased sensitivity of the at least one user interface 320 of input module 306, and/or increased sensitivity of the at least one user interface 320 of input module 306. For example, if the at least one user is unable to contact target 312 with at least one moveable dot 308 throughout the at least one activity and/or exercise, the processor may be configured to decrease a sensitivity of at least one interface 320 of input module 306 of sensory substitution apparatus 300. Accordingly, in this example, an increased deviation in the normal force as predetermined by input module 306 of sensory substitution apparatus 300 may be detected by at least one interface 320, such that a sensory feedback response (e.g., haptic, visual, and/or auditory) may be provided to the at least one user. In this manner, the at least one user may require additional time to progress and/or begin to increase the ability to develop and/or rehabilitate to perform the at least one activity and/or exercise the at least one low-functioning and/or non-functioning senses of the at least one user, while using sensory substitution apparatus 300.

Furthermore, as shown in FIGS. 4A-6, in another embodiment, the sensory substitution apparatus may comprise an input and output module, such that the sensory substitution apparatus may provide tactile/haptic, visual, and/or auditory feedback to the user, described herein below.

Therefore, in an embodiment, as shown in particular in FIGS. 4A-4B, input module 404 may comprise at least one interface 420 that is in mechanical and/or electrical communication with the output module 402 and/or the processor of sensory substitution apparatus 400, via conduit 406. In this embodiment, at least one interface 420 may also comprise a pressure sensor, and/or any sensor known in the art which may detect a force by the user. For ease of reference, the exemplary embodiment described herein refers to a pressure sensor pad, but this description should not be interpreted as limiting to other sensor pads. Additionally, conduit 406 may comprise mechanical components, electrical circuitry, and/or any components known in the art which are designed to transfer a force to output module 402. In an embodiment, conduit 406 may be configured to transfer the force received via input module 404 to output module 402. In addition, as shown in FIGS. 4A-4B, in an embodiment, output module 402 may be configured to provide a vibration force that is proportional to the engagement by the user on at least one interface 420 of input module 404 with respect to the normal force. In some embodiments, output module 402 may comprise a vibrating plate. In addition, as shown in FIG. 4C, an embodiment of the sensory substitution apparatus may include a binary input module 404. As such, in some embodiments, at least one interface 420 of input module 404 may comprise a button, such that once the at least one user has pressed the button, input module 404 may be configured to transmit at least one input signal, via conduit 406, to play and/or stop a sound from being emitted from output module 402. As such, in this embodiment, output module 402 may comprise any audio-based device known in the art which may play and/or stop a sound from being output.

Moreover, as shown in FIG. 4D, the output module of sensory substitution apparatus 400 may comprise auditory and/or tactile feedback. In this embodiment, the auditory, visual, and/or the haptic feedback responses may be used in combination with each other to provide at least one sensory feedback response to the at least one user. Accordingly, as shown in FIG. 5, at least one output modules 402a, 402b may be used in combination with at least one interface 420 of input module 404, and/or at least one secondary apparatus. Moreover, in the embodiment, as shown in FIG. 5, at least one interface 420 of input module 404 may comprise a rotatable rod, such that at least one interface 420 may be configured to receive a manual force from a user, which may be detected by input module 404, such that input module 404 may transmit a signal to the processor of sensory substitution apparatus 400. Additionally, in an embodiment, as the output module may comprise haptic/tactile, auditory and/or visual feedback, output module 402a, 402b may comprise at least one fan, audio-based device, haptic motor, and/or any device known in the art which may provide a sensory feedback response.

Accordingly, in an embodiment output module 402b may comprise a light. As such, in some embodiments, both output modules 402a and 402b may be configured to provide haptic feedback, such that the user may receive a vibrational force, a wind force, and/or any force known in the art which may provide a user with haptic feedback. In addition, as shown in FIGS. 5-6, as at least one interface 420 of input module 404 receives a force from the user, the at least one output module 402a and/or output module 402b may provide tactile and/or visual feedback to the user that is proportional to the received force. In addition, as shown in FIG. 6, at least one interface 420 of input module 404 may comprise a joystick, such that is in input module 404 may be in mechanical and/or electrical communication with output module 402. As such, in this embodiment, as shown in FIG. 6, output module 402 may be configured to provide a proportional feedback to the input of the user.

Additionally, in an embodiment, sensory substitution apparatus 400 may comprise a processor. As such, the processor may be configured to increase and/or decrease the electronic current supply to at least one output module 402, 402a, 402b, such that the at least one haptic motor may comprise an adjustable and/or proportional magnitude of vibration based on the direction and/or force applied to the at least one user interface 420 recognized by the at least one user interface 420 and/or input module 404. In this manner, in this embodiment, the at least one user interface 420 and/or input module 404 may compare the force provided by the at least one user on the at least one user interface 420 to the normal force, as predetermined by input module 404 of sensory substitution apparatus 400, such that the sensory feedback provided to the user may be proportional to the difference between the two forces. Additionally, when the processor receives the at least one input signal from input module 404, via conduit 406, the processor may be configured to activate at least one output module 402, 402a, 402b, such that at least one output module 402, 402a, 402b may be configured to provide a sensory feedback response, including but not limited to haptic/tactile, visual, and/or auditory. For example, when the at least one user provides at least one manual force to the at least one user interface 420 and/or input module 404, based on the speed and/or direction of force applied by the at least one user to the at least one user interface 420 of input module 404, the processor may be configured to provide a proportional haptic, visual, and/or auditory sensory feedback response.

In addition, in an embodiment, the output module may be configured to activate the at least one haptic motor, audio-based device, and/or at least one light, such that the at least one haptic motor, audio-based device, and/or at least one light may be configured to provide a proportional sensory feedback response to the at least one user for the following reasons, including but not limited to a predetermined amount of idle time passing, failing to contact the at least one user interface 420 and/or input module 404 within a specified amount of time, and/or when the output module comprises the secondary apparatus, when the at least one user drops input module 404 of sensory substitution apparatus 400. Accordingly, in this embodiment, output module 402, 402*a*, 402*b* may comprise a visual feedback such that at least one light may change colors and/or the light may alter a total brightness based on the input from the input module 404 by the user. Additionally, this embodiment, the auditory feedback response may comprise a beep, a chirp, at least one musical note, and/or any acoustic sound known in the art. Furthermore, output module 402, 402*a*, 402*b* of sensory substitution apparatus 400 may be configured to provide haptic feedback via a smooth vibration of at least one user interface 420, input module 404, and/or output module 402, 402*a*, 402*b*. Accordingly, when the at least one user interacts with the at least one user interface 420 and/or input module 404, output module 402, 402*a*, 402*b* of sensory substitution apparatus 400 may be configured to inhibit all vibration, provide a predetermined vibration, provide a pulsed vibration at a predetermined and/or random rate of frequency, and/or provide a higher and/or decreased intensity of vibration of at least one user interface 420, input module 404, and/or output module 402, 402*a*, 402*b*.

In some embodiments, the processor may be in electrical communication with at least one computing device and/or database. As such, in these other embodiments, sensory substitution apparatus 400 may comprise a memory, such that the processor may be configured to load the at least one input from the at least one user received at the at least one user interface 420 and/or input module 404 of sensory substitution apparatus 400. Accordingly, once the memory of sensory substitution apparatus 400 receives the at least one input of the user, the processor may be configured to transmit the at least one input to the at least one computing device and/or database. As such, the processor may be configured to electronically communicate with the at least one computing device via Bluetooth, Wi-Fi, ethernet, USB-port, and/or any electronic communication method known in the art. Furthermore, in these other embodiments, based on the information received by the at least one computing device and/or database, the processor may be configured to receive predetermined and/or periodical updates based upon the at least one input of the at least one user received at the at least one user interface 420 and/or input module 404 of sensory substitution apparatus 400.

Accordingly, in some embodiments, these predetermined and/or periodical updates may include but are not limited to less strenuous activities and/or exercises, less time intensive activities and/or exercises, decreased sensory feedback response, increased strenuous activities and/or exercises, increased time intensive activities and/or exercises, increased sensory feedback response, decreased sensitivity of the at least one user interface 420 and/or input module 404, and/or increased sensitivity of the at least one user interface 420 and/or input module 404, additional activities and/or exercises the at least one user may perform with sensory substitution apparatus 400, additional challenges during at least one activity and/or exercise and/or at least one additional and/or fewer requirement to complete the at least one activity and/or exercise, which may be performed by the at least one user using sensory substitution apparatus 400 based on the data provided.

Moreover, in some embodiments, at least one user may select, adjust, and/or input the following including but not limited to the sensitivity level of the at least one user interface 420 and/or input module 404 of sensory substitution apparatus 400, activities and/or exercises comprising varying difficulty based on time intensity and/or strain, and/or the sensory feedback response provided by the output module of sensory substitution apparatus 400, such that the user may increase or decrease the sensory substitution feedback response based on preference. For example, if the at least one user provides at least one manual force to the at least one user interface 420 and/or input module 404, the processor may be configured to increase a sensitivity of the at least one user interface 420 and/or input module 404 of sensory substitution apparatus 400. Accordingly, in this example, any slight deviation in the normal force as predetermined by input module 404 of sensory substitution apparatus 400 may be detected by at least one interface 420, such that a sensory feedback response (e.g., haptic, visual, and/or auditory) may be provided to the at least one user. In this manner, the at least one user may avoid stagnating and/or may increase the ability to develop and/or rehabilitate to perform the at least one activity and/or exercise the at least one low-functioning and/or non-functioning senses of the at least one user, while using sensory substitution apparatus 400.

In this same manner, in some embodiments if the processor of sensory substitution apparatus 400 detects continued sensory feedback responses (e.g., haptic, visual, and/or auditory) by sensory substitution apparatus 400 and/or the at least one input of the at least one user at the at least one user interface 420 and/or input module 404 of sensory substitution apparatus 400, the processor may be configured to transmit this data to the at least one computing device and/or database.

Moreover, in some embodiments, at least one user may select, adjust, and/or input the following including but not limited to the sensitivity level of the at least one user interface 420 and/or input module 404 of sensory substitution apparatus 400, activities and/or exercises comprising varying difficulty based on time intensity and/or strain, and/or the sensory feedback response provided by the output module of sensory substitution apparatus 400, such that the user may increase or decrease the sensory substitution feedback response based on preference. As such, in these other embodiments, the at least one computing device may configured to provide predetermined and/or periodical updates to sensory substitution apparatus 400, such that the activities, exercises, and/or sensory substitution apparatus 400 may comprise the following, including but not limited to, less strenuous exercises, less time intensive exercises, decreased sensory feedback response, increased sensory feedback response, decreased sensitivity of the at least one user interface 420 and/or input module 404, and/or increased sensitivity of the at least one user interface 420 and/or input module 404. For example, if the at least one user unable to provide and/or consistently provide (based on a predetermined amount required, as defined by the processor, inputted by the at least one user via the computing device, and/or automatically inputted by the computing device) at least one manual force to the at least one user interface 420 and/or input module 404, the processor may be configured to decrease a sensitivity of at least one interface 420 and/or input module 404 of sensory substitution apparatus 400. Accordingly, in this example, an increased deviation in the normal force as predetermined by input module 404 of sensory substitution apparatus 400 may be detected by at least one interface 420 and/or input module 404, such that a sensory feedback response (e.g., haptic, visual, and/or auditory) may be provided to the at least one user. In this manner, the at least one user may require additional time to progress and/or begin to increase the ability to develop and/or rehabilitate to perform the at least one activity and/or exercise the at least one low-functioning and/or non-functioning senses of the at least one user, while using sensory substitution apparatus 400.

Method of Use:

Returning now to FIGS. 1A-2B, in conjunction with FIG. 7, a method 500 is depicted for using sensory substitution apparatus 100. The steps delineated are merely exemplary of a preferred order for using sensory substitution apparatus 100. The steps may be carried out in another order, with or without additional steps included therein. Additionally, the steps may be carried out with alternative embodiments of sensory substitution apparatus 100, as contemplated in the above description.

As shown in FIGS. 1A-2B, in conjunction with FIG. 7, the method 500 for using sensory substitution apparatus 100, begins with step 502, providing sensory substitution apparatus 100. The next step, step 504, comprises grasping at least one interface 106 of sensory substitution apparatus 100. Next, at step 506, sensory substitution apparatus 100 is activated, such that the at least one light 122 and/or the at least one internal electrical component 120 may be in electrical communication within sensory substitution apparatus 100, allowing sensory substitution apparatus 100 to automatically communicate and/or provide real-time sensory feedback to the user. At step 508, the user performs at least one rehabilitation and/or development-based exercises using sensory substitution apparatus 100. For example, in an embodiment, sensory substitution apparatus 100 may be used as a balance beam, allowing the at least one user to move while holding apparatus 100 and/or viewing the at least one light 122, such that the at least one user may maintain a balance during a walking exercise. In another embodiment, for example, sensory substitution apparatus 100 may be used during a squat-based exercise, during which the user may move up and/or down with respect to the surface while holding sensory substitution apparatus 100 and/or monitoring the at least one light 122. Furthermore, in another example, hand-operated sensory substitution apparatus 100 may be used during arm-raising and bench-pressing exercises in a similar manner, such that the user may monitor the at least one light 122 to maintain a proper form during the exercise. Accordingly, in these embodiments, sensory substitution apparatus 100 may be configured to provide tactile and/or haptic feedback via at least one haptic motor, such that the user may maintain balance during the walking exercise, move up and/or down with respect to the surface while holding sensory substitution apparatus 100, and/or may maintain proper form during the exercise. Finally, at step 510, sensory substitution apparatus 100 is released by the user and deactivated until further use is required.

Returning now to FIGS. 3A-6, in conjunction with FIG. 8, a method 600 is depicted for using sensory substitution apparatus 300, 400. The steps delineated are merely exemplary of a preferred order for using sensory substitution apparatus 300, 400. The steps may be carried out in another order, with or without additional steps included therein. Additionally, the steps may be carried out with alternative embodiments of sensory substitution apparatus 300, 400, as contemplated in the above description.

As shown in FIGS. 3A-6, in conjunction with FIG. 8, the method 600 for using sensory substitution apparatus 300, 400 begins at step 602, providing a sensory substitution apparatus 300, 400. The next step, step 604, comprising receiving an engagement from at least one user, via an input module of sensory substitution apparatus 300, 400. Next, at step 606, sensory substitution apparatus 300, 400 outputs a feedback response, such that the feedback response may be proportional to the engagement detected by the input module by the at least one user. For example, in an embodiment, the engagement of the at least one user detected by sensory substitution apparatus 300, 400, described herein above, may include, but is not limited to, a position of a sensory substitution apparatus, a binary on/off selection, and a variable input provided through a joystick, a button, a pad, a pivoting rod, or a similar input device. Additionally, the output provided by sensory substitution apparatus 300, 400, may be proportional to the input received from the user. As such, in this embodiment, the feedback response may include, but is not limited to a sensory response that may be targeted to at least one sensory function of the user. Accordingly, as the user varies the input to the systems, the output proportionally may vary as a direct result of the user's input. Furthermore, at step 608, the at least one may receive the sensory feedback response, via the output module of the sensory substitution apparatus 300, 400, proportional to the engagement of the user detected by the sensory substitution apparatus that may have been initially provided by the user. Finally at step 610, the at least one user releases the input module of sensory substitution apparatus 300, 400 and deactivates sensory substitution apparatus 300, 400 until further use is required. Moreover, sensory substitution apparatus 100, 300, 400 may be used within a rehabilitation and/or developmental improvement setting. For example, sensory substitution apparatus 100, 300, 400 may be configured to provide appropriate proportional responses to at least one user input of at least one user in order to create new pathways for brain development.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

INCORPORATION BY REFERENCE

[1] Bird, T. et al. *Sensorimotor Training Induced Neural Reorganization After Stroke: A Case Series*. J. Neurol. Phys. Ther. 2013. 37 (1): 27-36.

[2] Van de Winckel, A. et al. *Exploratory study of how Cognitive Multisensory Rehabilitation restores parietal operculum connectivity and improves upper limb movements in chronic stroke*. Scientific Reports. 2020. 10:20278.

[3] Turolla, A. et al. *Haptic-Based Neurorehabilitation in Poststroke Patients: A Feasibility Prospective Multicentre Trial for Robotics Hand Rehabilitation. Computational and Mathematical Methods in Medicine*. 2013.

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

It is also to be understood that the following claims are intended to cover all of the generic and specific features of the invention herein described, and all statements of the scope of the invention which, as a matter of language, might be said to fall therebetween.

What is claimed is:

1. A method of augmenting sensory perception of at least one user, the method comprising:

providing a sensory substitution apparatus including:

a processor;

an input module communicatively coupled to the processor, the input module comprising at least one interface, wherein the at least one interface is configured to detect an engagement of the at least one user; and an output module communicatively coupled to the processor, the output module comprising a haptic motor, wherein the haptic motor of the output module is configured to provide a sensory feedback response to the at least one user;

receiving an engagement from the at least one user through the input module; and activating, via the processor, the output module to deliver the sensory feedback response proportional to changes in the engagement of the at least one user with the at least one interface, wherein the sensory feedback response includes directional haptic cues from the haptic motor to guide a movement of the housing of the sensory substitution apparatus during the changes in engagement by the at least one user.

2. The method of claim 1, wherein the input module includes at least one user interface configured to be engaged by the at least one user, via tactile, auditory, or visual stimuli.

3. The method of claim 2, wherein the sensory feedback response varies based on a change in a normal force applied to the at least one user interface of the input module by the at least one user.

4. The method of claim 1, wherein the output module includes at least one light array.

5. The method of claim 4, wherein the sensory feedback response is a visual signal with variable intensity, color, or both.

6. The method of claim 1, further comprising the steps of:

detecting a change in an orientation of the sensory substitution apparatus relative to a predefined area;

generating the sensory feedback response proportional to the detected change in orientation; and outputting the sensory feedback response via the output module using a haptic stimulus, an auditory stimulus, or both.

7. The method of claim 1, further comprising the steps of:

transmitting, via the processor in electronic communication with a computing device, the engagement of the at least one user, the outputted sensory feedback response, or both to the computing device for analysis; and adjusting sensory feedback response parameters of the output module based on received computational instructions in response to the transmitted engagement of the at least one user, the outputted sensory feedback response, or both.

8. A method for rehabilitative training using a sensory substitution apparatus, comprising:

grasping a housing of the sensory substitution apparatus equipped with:

an input module configured to detect engagement by at least one user;

an output module comprising at least one haptic motor, the output module configured to provide a sensory feedback response; and a processor communicatively coupled the input module and output module;

performing an activity, an exercise, or both while holding the housing of the sensor substitution apparatus;

detecting the engagement of the at least one user during the activity, exercise, or both, in real-time, via the input module; and activating, via the processor, the output module to deliver the sensory feedback response to the at least one user from the at least one haptic motor that is proportional to the engagement detected by the input module, wherein the activity, the exercise, or both include maintaining balance using the sensory feedback response provided by the at least one haptic motor.

9. The method of claim 8, wherein the at least one haptic motor is disposed within the housing of the sensory substitution apparatus.

10. The method of claim 8, wherein the activity, the exercise, or both include dynamic motions such as lifting, tilting, or rotating the housing of the sensory substitution apparatus to adjust the sensory feedback response is, in real-time, accordingly.

11. The method of claim 8, further comprising the steps of:

setting at least one feedback sensitivity levels based on a capability of the at least one user; and modifying the sensitivity level in response to progress of the at least one user over time.

12. The method of claim 8, wherein the sensory feedback response includes directional haptic cues to guide a movement of the housing of the sensory substitution apparatus, via the at least one user, during the activity, exercise, or both.

13. A method for interactive sensory training, the method comprising:

providing a sensory substitution apparatus with:

an input module featuring a joystick, a pressure-sensitive surface, or both;

an output module with visual, auditory, haptic or tactile capabilities; and a processor to process at least one input signal generated by the input module in response to the engagement of at least one user, via the joystick, the pressure-sensitive surface, or both;

engaging with the input module to perform a task requiring sensory coordination;

detecting input of the at least one user, via the input module, and translating, via the processor communicatively coupled to the input module and the output module, the input of the at least one user into proportional output signals;

guiding the at least one user toward a task objective with visual, auditory, or tactile sensory feedback response, wherein the sensory feedback response includes directional haptic cues to guide the at least one user toward the task objective; and dynamically adjusting the sensory feedback response, in real-time, based on task performance by the at least one user.

14. The method of claim 13, wherein the task objective involves navigating a graphical interface using directional input detected by the input module.

15. The method of claim 13, wherein the sensory feedback response includes illuminating a light array to indicate task progression.

16. The method of claim 13, wherein the sensory feedback response includes producing audio signals with varying frequency or volume to indicate success or errors.

17. The method of claim 13, further comprising the steps of:

storing task performance data of the at least one user based on the sensory feedback response of the output module in a memory module communicatively coupled to the processor; and analyzing the data to customize subsequent tasks or feedback.

18. The method of claim 13, further comprising the step of, integrating the sensory substitution apparatus with augmented reality tools to enhance user interaction.

19. The method of claim 13, wherein the sensory substitution apparatus delivers simultaneous multimodal feedback, including visual, auditory, and tactile responses.

20. The method of claim 13, wherein the sensory feedback response intensity increases as the at least one user approaches the task objective, providing motivational reinforcement.

* * * * *